US011158091B2

(12) United States Patent
Panetta et al.

(10) Patent No.: US 11,158,091 B2
(45) Date of Patent: Oct. 26, 2021

(54) METHODS AND SYSTEMS FOR HUMAN IMPERCEPTIBLE COMPUTERIZED COLOR TRANSFER

(71) Applicants: Trustees of Tufts College, Medford, MA (US); The Board of Regents of the University of Texas System, Austin, TX (US)

(72) Inventors: Karen Panetta, Rockport, MA (US); Long Bao, Malden, MA (US); Sos Agaian, San Antonio, TX (US)

(73) Assignees: Trustees of Tufts College, Medford, MA (US); THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 307 days.

(21) Appl. No.: 16/331,223

(22) PCT Filed: Sep. 7, 2017

(86) PCT No.: PCT/US2017/050567
§ 371 (c)(1),
(2) Date: Mar. 7, 2019

(87) PCT Pub. No.: WO2018/049084
PCT Pub. Date: Mar. 15, 2018

(65) Prior Publication Data
US 2019/0279402 A1    Sep. 12, 2019

Related U.S. Application Data

(60) Provisional application No. 62/384,419, filed on Sep. 7, 2016.

(51) Int. Cl.
*G06T 7/10* (2017.01)
*G06T 11/00* (2006.01)
(Continued)

(52) U.S. Cl.
CPC ............. *G06T 11/001* (2013.01); *G06T 7/10* (2017.01); *G06T 7/11* (2017.01); *G06T 7/143* (2017.01);
(Continued)

(58) Field of Classification Search
CPC ..... G06T 7/10; G06T 7/11; G06T 7/90; G06T 7/143
See application file for complete search history.

(56) References Cited

U.S. PATENT DOCUMENTS

| 4,517,230 A | 5/1985 | Crawford |
| 4,656,065 A | 4/1987 | Yacovella |

(Continued)

FOREIGN PATENT DOCUMENTS

| EP | 1054352 | 11/2000 |
| WO | 2009092567 | 7/2009 |

OTHER PUBLICATIONS

"Local Color Transfer Between Images using Dominant Colors", Jae-Doug You, Min-Ki Park, Ji-Ho Cho and Kwan H. Lee, SPIE Journal of Electronic Imaging 22(3), Jul.-Sep. 2013 (Yoo et al). (Year: 2013).*

(Continued)

*Primary Examiner* — Myron Wyche
(74) *Attorney, Agent, or Firm* — Quarles & Brady LLP

(57) ABSTRACT

The present disclosure includes systems and methods for color transfer. The method includes receiving a target image, and determining dominant source colors. The method further includes transforming the target image into a color model including a target luminance component and a target color information component. Additionally, the method includes segmenting the target image into a plurality of target segments based on the target color information component or the target luminance component and extracting (Continued)

dominant target colors from the target image by extracting information for at least one of the dominant target colors from each target segment of the plurality of target segments. Further, the method includes generating a color mapping relationship between the dominant target colors and the dominant source colors, and creating a recolored target image using the color mapping relationship.

20 Claims, 21 Drawing Sheets

(51) Int. Cl.
    *G06T 7/90*         (2017.01)
    *H04N 1/60*        (2006.01)
    *G06T 7/11*         (2017.01)
    *G06T 7/143*       (2017.01)
    *H04N 1/64*        (2006.01)
(52) U.S. Cl.
    CPC ............... *G06T 7/90* (2017.01); *H04N 1/60* (2013.01); *H04N 1/644* (2013.01); *G06T 2207/10024* (2013.01); *G06T 2207/20076* (2013.01); *G06T 2207/30201* (2013.01)

(56) References Cited

U.S. PATENT DOCUMENTS

| | | | |
|---|---|---|---|
| 4,981,834 A | 1/1991 | Sakojiri | |
| 5,130,789 A | 7/1992 | Dobbs | |
| 5,264,242 A | 11/1993 | Speer | |
| 5,408,595 A | 4/1995 | Tajima | |
| 6,271,859 B1 | 8/2001 | Asente | |
| 6,628,828 B1 | 9/2003 | Stokes | |
| 6,675,394 B2 | 1/2004 | Egnew | |
| 6,775,405 B1 | 8/2004 | Zhu | |
| 7,949,181 B2 * | 5/2011 | Padfield | G06K 9/0014 382/164 |
| 7,995,071 B2 | 8/2011 | Guinan | |
| 8,031,202 B2 | 10/2011 | Perronnin | |
| 8,144,986 B2 | 3/2012 | Ma | |
| 8,213,735 B2 | 7/2012 | Cooksey | |
| 8,373,720 B2 | 2/2013 | Voliter | |
| 8,542,324 B2 | 9/2013 | Wang | |
| 8,594,446 B2 | 11/2013 | Morales | |
| 8,913,827 B1 | 12/2014 | Fang | |
| 2004/0055068 A1 | 3/2004 | Egnew | |
| 2004/0202846 A1 | 10/2004 | Conk | |
| 2009/0109236 A1 | 4/2009 | Xu | |
| 2009/0196501 A1 | 8/2009 | Ma | |
| 2009/0233060 A1 | 9/2009 | Duke | |
| 2010/0061629 A1 | 3/2010 | Ma | |
| 2011/0247121 A1 | 10/2011 | Cart | |
| 2011/0293177 A1 * | 12/2011 | Wang | H04N 1/465 382/167 |
| 2011/0299143 A1 * | 12/2011 | Alessi | H04N 1/46 358/504 |
| 2012/0017353 A1 | 1/2012 | Morgan | |
| 2012/0075329 A1 | 3/2012 | Skaff | |
| 2013/0170749 A1 | 7/2013 | Tian | |
| 2013/0343609 A1 | 12/2013 | Wilson | |
| 2014/0043351 A1 | 2/2014 | Karlov | |
| 2014/0321718 A1 | 10/2014 | Wabgaonkar et al. | |
| 2015/0170380 A1 * | 6/2015 | Duwenhorst | G06F 16/5838 345/594 |
| 2015/0244946 A1 | 8/2015 | Agaian | |
| 2016/0104453 A1 * | 4/2016 | Borenstein | G09G 3/002 348/62 |
| 2016/0171954 A1 | 6/2016 | Guo | |

OTHER PUBLICATIONS

Agaian, S. S. "Visual morphology." Electronic Imaging'99. International Society for Optics and Photonics, 1999.

Agaian, S. S. et al. "A Comparative Study of Image Feature Detection and Matching Algorithms for Touchless Fingerprint Systems." Electronic Imaging 2016.15 (2016): 1-9. IngentaConnect.

Agaian, S. et al "New haze removal scheme and novel measure of enhancement." Cybernetics (CYBCONF), 2013 IEEE International Conference on. IEEE, 2013.

Bernsen, J. "Dynamic Thresholding of Grey-Level Images." International Conference on Pattern Recognition. vol. 2. N.p., 1986. 1251-1255.

Bugeau, et al "Variational Exemplar-Based Image Colorization," Image Processing, IEEE Transactions on, vol. 23, pp. 298-307, 2014.

Cheng, H. D., et al. "Threshold Selection Based on Fuzzy c-Partition Entropy Approach." Pattern Recognition 31.7 (1998): 857-870. ScienceDirect.

Chi, J.T., et al., "k-POD: A Method for k-Means Clustering of Missing Data," The American Statistician, vol. 70 , Iss. 1, 2016.

Derpanis, K. G. "Overview of the RANSAC Algorithm." Image Rochester NY 4.1 (2010): 2-3.

Grauman, K et al. "Visual Object Recognition." Synthesis Lectures on Artificial Intelligence and Machine Learning 5.2 (2011): 1-181.

International Search Report and Written Opinion for PCT/US2017/050567, dated Jan. 4, 2018, 16 pages.

Jiao, X., et al., "A visual consistent adaptive image thresholding method." The Imaging Science Journal 64.1 (2016): 34-49.

Kapur, J. N., et al. "A New Method for Gray-Level Picture Thresholding Using the Entropy of the Histogram." Computer Vision, Graphics, and Image Processing 29.3 (1985):273-285. ScienceDirect.

Lindeberg, T. "Feature Detection with Automatic Scale Selection." International Journal of Computer Vision 30.2 (1998): 79-116.

Liu, S., et al., "Selective color transferring via ellipsoid color mixture map," Journal of Visual Communication and Image Representation, vol. 23, pp. 173-181, Jan. 2012.

Lowe, D. G. "Distinctive Image Features from Scale-Invariant Keypoints." International Journal of Computer Vision 60.2 (2004):91-110.

Maslennikova et al,, "Interactive local color transfer between images," in Proceedings of Graphicon, 2007.

Mikolajczyk, K. et al. "An Affine Invariant Interest Point Detector." Computer Vision—ECCV 2002. Springer, Berlin, Heidelberg, 2002. 128-142.

Mosquera-Lopez, C., et al, "Iterative local color normalization using fuzzy image clustering," Proc. SPIE 8755, Mobile Multimedia/Image Processing, Security, and Applications 2013, May 28, 2013.

Nercessian, S.C. et al. "Multiresolution Decomposition Schemes Using the Parameterized Logarithmic Image Processing Model with Application to Image Fusion." EURASIP Journal on Advances in Signal Processing 2011.1 (2011): 515084.

Nercessian, S.C. et al.. Agaian. "Multiscale Image Fusion Using an Adaptive Similarity-Based Sensor Weighting Scheme and Human Visual System-Inspired Contrast Measure." Journal of Electronic Imaging 21.2 (2012): 021112-1.

Tai, Yu-Wing, et al., "Local color transfer via probabilistic segmentation by expectation-maximization," in Computer Vision and Pattern Recognition, 2005. CVPR 2005. IEEE Computer Society Conference on, 2005, pp. 747-754 vol. 1.

Otsu, N. "A Threshold Selection Method from Gray-Level Histograms." Automatica 11.285-296 (1975): 23-27.

Panetta, K, et al. "Choosing the optimal spatial domain measure of enhancement for mammogram images." Journal of Biomedical Imaging 2014 (2014): 3.

Panetta, K., et al. "Parameterized logarithmic framework for image enhancement." IEEE Transactions on Systems, Man, and Cybernetics, Part B (Cybernetics) 41.2 (2011): 460-473.

Paul, S. et al. "Multi-Exposure and Multi-Focus Image Fusion in Gradient Domain." Journal of Circuits, Systems and Computers 25.10 (2016): 1650123.

Pitie, F., et al, "Automated colour grading using colour distribution transfer," Computer Vision and Image Understanding, vol. 107, pp. 123-137, 2007.

(56) References Cited

OTHER PUBLICATIONS

Reinhard, E., et al, "Color transfer between images," IEEE Computer Graphics and Applications, vol. 21, pp. 34-41, 2001.
Roopaei, Mehdi, et al. "Cross-entropy histogram equalization." Systems, Man and Cybernetics (SMC), 2014 IEEE International Conference on. IEEE, 2014.
Rosenfeld, A., et al "Thresholding Using Relaxation." IEEE Transactions on Pattern Analysis and Machine Intelligence PAMI-3.5 (1981): 598-606. IEEE Xplore.
Sauvola, J., et al "Adaptive Document Image Binarization." Pattern Recognition 33.2 (2000): 225-236. ScienceDirect.
Sezgin, M. "Survey over image thresholding techniques and quantitative performance evaluation." Journal of Electronic Imaging 13.1 (2004): 146-168.
Tang, K., et al. "An improved scheme for minimum cross entropy threshold selection based on genetic algorithm." Knowledge-Based Systems 24.8 (2011): 1131-1138.
Tsai, W-H. "Moment-Preserving Thresolding: A New Approach." Computer Vision, Graphics, and Image Processing 29.3 (1985): 377-393. ScienceDirect.
Tuytelaars, T. et al. "Local Invariant Feature Detectors: A Survey." Foundations and Trends® in Computer Graphics and Vision 3.3 (2008): 177-280.
Welsh, T., et al, "Transferying color to greyscale images," in Proc. Conf. Comput. Graph. Interact. Tech., 2002, pp. 277-280.
Wen, C.-L., et al, "Example-based Multiple Local Color Transfer by Strokes," Computer Graphics Forum, vol. 27, pp. 1765-1772, 2008.
Wharton, E., et al, Comparative study of logarithmic enhancement algorithms with performance measure, Electronic Imaging 2006, 606412-606412-12.
White, J. M., et al. "Image Thresholding for Optical Character Recognition and Other Applications Requiring Character Image Extraction." IBM Journal of Research and Development 27.4 (1983): 400-411. IEEE Xplore.
Wu, A. Y., et al. "Threshold Selection Using Quadtrees." IEEE Transactions on Pattern Analysis and Machine Intelligence PAMI-4.1 (1982): 90-94. IEEE Xplore.
Yi, X., et al., "Example-Based Color Transfer for Gradient Meshes," IEEE Transactions on Multimedia, vol. 15, pp. 549-560, 2013.
Yoo, J.-D., et al, "Local color transfer between images using dominant colors," Journal of Electronic Imaging, vol. 22, pp. 033003-033003, 2013.

* cited by examiner

METHODS AND SYSTEMS FOR HUMAN IMPERCEPTIBLE COMPUTERIZED COLOR TRANSFER

CROSS-REFERENCE TO RELATED APPLICATIONS

This application represents the national stage entry of PCT/US2017/050567, filed Sep. 7, 2017, which claims benefit of U.S. Provisional Patent Application 62/384,419 filed Sep. 7, 2016. The contents of these applications are hereby incorporated by reference as set forth in their entirety herein.

BACKGROUND OF THE INVENTION

Various aspects of the present disclosure relate generally to methods and systems relating to image and video analytics, object recognition, and more particularly to coloring for grayscale images, recoloring for color images and videos, and for generating recolored image sequences.

Many professional image/video editing software algorithms and packages have been developed to achieve different image processing for multimedia applications. Color transfer is one popular application to change the colors in an image sequence. However, these professional image editing software tools require the users to process most tasks manually, resulting a significant investment in labor and time. For example, to change the color of an object in an image, a user must select the object by drawing/selecting the boundaries of the object. Next, the user must select a desired color from a color palette, and "repaint" (recolor) the selected object. Accordingly, manual color transfer technology is limited, time-intensive, and user-intensive.

Therefore, what is needed is an improved color transfer system and method for coloring images and videos and generating a sequence of color images and videos.

SUMMARY OF THE INVENTION

The foregoing needs are met by the methods and systems for transferring color according to the present disclosure.

As stated above, various aspects of the present disclosure may generally relate to image and video analytics and object recognition. In particular, the present disclosure includes systems and methods for coloring grayscale images, recoloring color images and videos, and generating new recolored image sequences. Applications of the systems and methods may include, but are not limited to, consumer products, healthcare, the medical industry (e.g. whole sliding imaging and histology), the fashion industry, the military (e.g. camouflage design), security (e.g. facial recognition, location recognition), database standardization, interior design, biometrics, medical aiding (e.g. color blindness support and dyslexia (or other learning disorder) support), animation simulation, artwork recoloring, publishing, and other color-transfer technology.

Aspects of the present disclosure generally relate to image processing, and particularly to color transfer. As one non-limiting example, the present disclosure may be implemented in fashion design, and specifically to explore different color effects or material effects on design. As another non-limiting example, the present disclosure may be used to create camouflage design (e.g. for the military). In another non-limiting example, systems and methods in accordance with the present disclosure may be used in display devices for individuals with color vision deficiency, as well as support systems for people affected by color blindness.

In one aspect, the present disclosure includes a method of transferring color to recolor a target image. The method includes receiving a target image, and determining dominant source colors. The method further includes transforming the target image into a color model including a target luminance component and a target color information component. Additionally, the method includes segmenting the target image into a plurality of target segments based on the target color information component or the target luminance component and extracting dominant target colors from the target image by extracting information for at least one of the dominant target colors from each target segment of the plurality of target segments. Further, the method includes generating a color mapping relationship between the dominant target colors and the dominant source colors, and creating a recolored target image using the color mapping relationship.

In another aspect, the present disclosure includes a method for coloring an input grayscale image into an output color image. The method includes selecting dominant source colors from a color palette or one color from a source image. The method further includes applying a color model transformation to transform a target image in an original color model into a color model wherein a target luminance component and a target color information component are independent. Additionally, the method includes dividing the target image into a plurality of target regions according to the target luminance component. The method further includes generating a color mapping relationship between at least one dominant target color from each of the plurality of target regions and a dominant source color, and transferring dominant source color information into a target image. The method additionally includes applying an inverse color model algorithm to transfer the color model to a selected color model.

In another aspect, the present disclosure includes a method for recoloring an input image into an output image with another color appearance. The method includes selecting dominant source colors. The method further includes applying a color model transformation algorithm to transform a target image in an original color model into a color model wherein a target luminance component and a target color information component are independent. Additionally, the method includes dividing the target image into a plurality of target segments according to the target color information component, and extracting dominant target colors from the target image by extracting information for at least one of the dominant target colors from each target segment of the plurality of target segments. The method further includes generating a color mapping relationship between the dominant target colors and the dominant source colors, and transferring source color information into a target image based on information generated from a source color input algorithm. The method additionally includes applying an inverse color model algorithm to transfer the color model to a selected color model.

In another aspect, the present disclosure includes a method for image segmentation by data grouping. The method further includes receiving an original image and setting a number of segment groups manually or automatically via a computer algorithm. Additionally, the method includes applying a color model transformation algorithm to transform the original image in an original color model into a color model wherein a target luminance component and a target color information component are independent. The method additionally describes including the target color information component as a feature for each pixel in the original image. Further, the method includes grouping the pixels via a Logarithmic GMM method, using each target color information component.

In another aspect, the present disclosure includes a method for image segmentation by data grouping. The method includes receiving an original image, and setting a number of segment groups manually or automatically via a computer algorithm. The method further includes applying a color model transformation algorithm to transform the original image in an original color model into a color model wherein a target luminance component and a target color information component are independent. Additionally, the method describes including the target color information component as a feature for each pixel in the original image. Further, the method includes grouping the pixels via a Logarithmic K-means method, using each target color information component.

In another aspect, the present disclosure includes a method for generating an image sequence showing a gradual changing from a first color appearance to a second color appearance. The method includes determining at least two sets of dominant source colors. The method further includes applying a color model transformation algorithm to transform a target image in a first color model into a color model wherein a target luminance component and a target color information component are independent. Additionally, the method includes segmenting the target image into a plurality of target segments according to the target color information component or the target luminance component. The method further includes extracting dominant target colors from the target image by extracting information for at least one of the dominant target colors from each target segment of the plurality of target segments. Additionally, the method includes generating a color mapping relationship between the dominant target colors and the at least two sets of dominant source colors. The method includes calculating color information for probabilistic color transfer via a color variation curve, and transferring the color information into a target image by using the color information generated from the color variation curve. The method further includes applying an inverse color model algorithm to transfer the first color model to a selected second color model.

In another aspect, the present disclosure includes a support system for color-impaired users. The system includes a pair of glasses configured to be worn by a color-impaired user. The system further includes at least one camera affixed to the pair of glasses, and a processor in communication with the at least one camera. The processor is configured to capture at least one image via the at least one camera, determine dominant source colors, and segment a target image into a plurality of target segments based on a target color information component. The processor is further configured to extract dominant target colors from the target image by extracting information for at least one of the dominant target colors from each target segment of the plurality of target segments. Additionally, the processor is configured to generate a color mapping relationship between the dominant target colors and the dominant source colors, and transfer color information into the target image. The processor is additionally configured to generate images for the color-impaired user, and display the generated images on at least one lens of the pair of glasses.

In another aspect, the present disclosure includes a method for testing the performance of biometrics recognition technology. The method includes receiving a biometrics image. The method further includes determining dominant source colors, and segmenting the biometrics image into a plurality of biometric segments based on a biometrics color information component. Additionally, the method includes extracting dominant target colors from the biometric image by extracting information for at least one of the dominant target colors from each biometric segment of the plurality of biometric segments. Further, the method includes generating a color mapping relationship between the dominant target colors and the dominant source colors, and transferring color information into the biometrics image. Additionally, the method includes extracting at least one biometrics feature from the biometrics image. The method includes comparing the at least one biometrics feature with a reference data set, and generating a test result.

In another aspect, the present disclosure includes a method for coloring an input grayscale image into an output colorful image. The method includes applying a color model transformation algorithm to transform a target image in an original color model into a color model wherein a target luminance component and a target color information component are independent. Additionally, the method includes segmenting a target image into a plurality of target segments based on the target luminance component. Further, the method includes extracting structure features from the target image by extracting information for at least one of the structure features from each target segment of the plurality of target segments. The method includes generating a source color for each target segment based on each structure feature, via a machine learning model, and transferring the dominant source colors into the target image via a copy process. The method further includes applying an inverse color model algorithm to transfer the original color model to a selected second color model.

In another aspect, the present disclosure includes a method for partial color transfer. The method includes selecting an object to be color transferred, the object included in a target image. Additionally, the method includes determining dominant source colors, and transforming the target image from an original color model into a color model including a target luminance component and a target color information component. The method further includes segmenting the object into a plurality of object segments based on the target color information component or the target luminance component. Additionally, the method includes extracting dominant target colors from the object by extracting information for at least one of the dominant target colors from each object segment of the plurality of object segments. The method further includes generating a color mapping relationship between the dominant target colors and the dominant source colors. Additionally, the method includes transferring color information into the object, and applying an inverse color model algorithm to transfer the original color model to a selected color model.

In another aspect, the present disclosure includes a method for partial color transfer in a video. The method includes inputting at least one object to be color transferred, the at least one object included in a video. The method further includes detecting the at least one object in each frame image of the video, and determining dominant source colors. Additionally, the method includes transforming each frame image from an original color model into a color model including a frame luminance component and a frame color information component. Further, the method includes segmenting the at least one object into a plurality of object segments based on the frame color information component or the frame luminance component. Additionally, the method includes extracting dominant target colors from the at least one object by extracting information for at least one of the dominant target colors from each object segment of the plurality of object segments. The method includes generating a color mapping relationship between the dominant target colors and the dominant source colors, and transferring color information into the at least one object in each frame image. The method additionally includes applying an inverse color model algorithm to transfer the original color model to a selected color model.

In another aspect, the present disclosure includes a method of recoloring text for people with a learning disability. The method includes detecting and extracting text from a target image. The method further includes transforming the target image from an original color model into a color model including a target luminance component and a target color information component. Additionally, the method includes determining dominant source colors. Further, the method includes transferring color information into the text via probabilistic color transfer. The method additionally includes applying an inverse color model algorithm to transfer the original color model to a selected color model.

The foregoing and other aspects of the invention will appear from the following description. In the description, reference is made to the accompanying drawings which form a part hereof, and in which there is shown by way of illustration a preferred aspect of the invention. Such aspect does not necessarily represent the full scope of the invention, however, and reference is made therefore to the claims and herein for interpreting the scope of the invention.

BRIEF DESCRIPTION OF THE DRAWINGS

The present disclosure will hereafter be described with reference to the accompanying drawings, wherein like reference numerals denote like elements.

DETAILED DESCRIPTION

Figure 1:
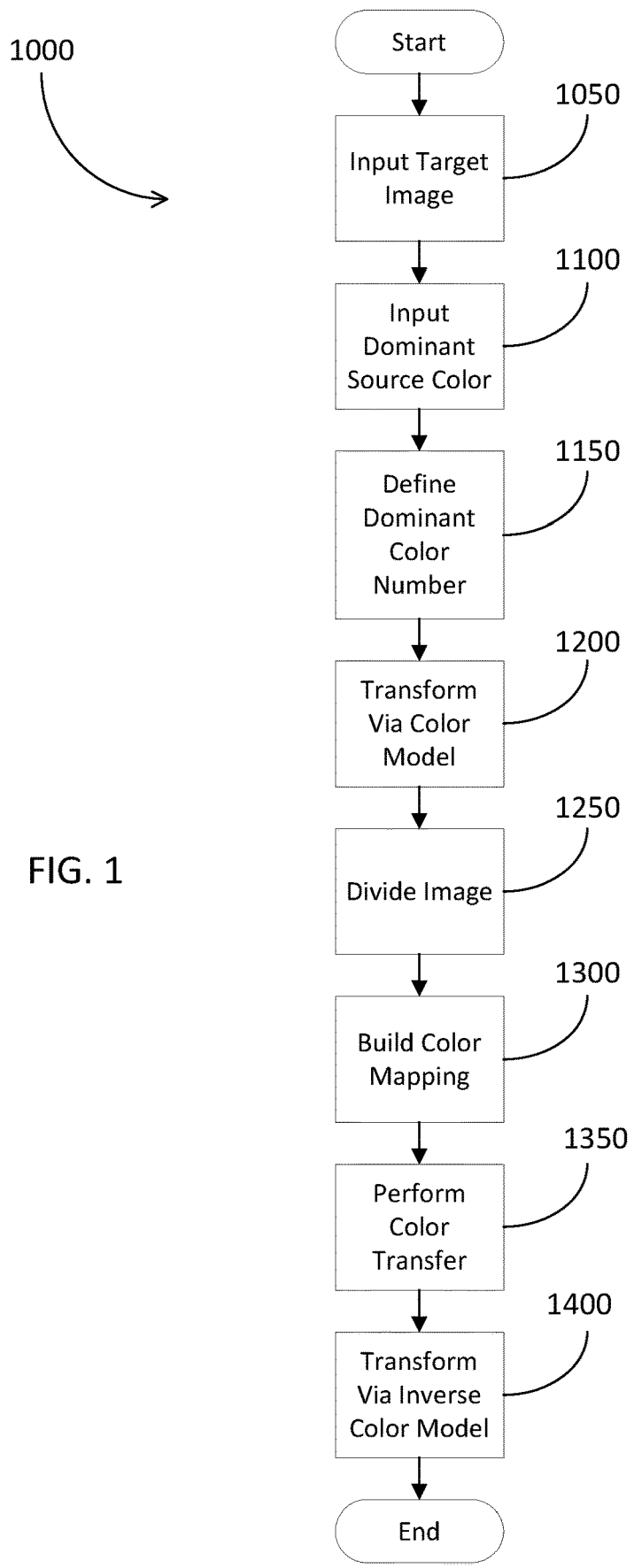
FIG. 1 is a flow diagram illustrating a non-limiting HIC-based color transfer method according to the present disclosure.

Before the present invention is described in further detail, it is to be understood that the invention is not limited to the particular aspects described. It is also to be understood that the terminology used herein is for the purpose of describing particular aspects only, and is not intended to be limiting. The scope of the present invention will be limited only by the claims. As used herein, the singular forms "a", "an", and "the" include plural aspects unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Aspects referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

As used herein, the term "target image" generally refers to an image to be color transformed. Also used herein, the term "source image" generally refers to an image containing color information to be transferred. In a general sense, color elements of the source image may be used to recolor a target image (e.g. an input image), resulting in a recolored output image. As used herein, the term "artifacts" generally refers to unnatural image contents which may appear fake. As used herein, the term "Human Imperceptible Computerized System" ("HIC-based System") generally refers to a model of how humans perceive images in a natural manner.

Aspects of the present disclosure are explained in greater detail in the description that follows. Aspects of the disclosure that are described with respect to a method are applicable to aspects related to systems and other methods of the disclosure, unless the context clearly dictates otherwise. Similarly, aspects of the disclosure that are described with respect to a system are applicable to aspects related to methods and other systems of the disclosure, unless the context clearly dictates otherwise.

As previously described, traditional color transfer technology can be limited, time-intensive, and user-intensive. Existing color transfer methods can generally be classified as: (1) global color (GC) transfer methods, and (2) local color (LC) transfer methods.

A global color (GC) transfer is a transformation that does not consider the color correspondences and spatial relations of different colored regions. The idea of global color transfer was derived from E. Reinhard, M. Adhikhmin, B. Gooch, and P. Shirley, "Color transfer between images," *IEEE Computer Graphics and Applications*, vol. 21, pp. 34-41, 2001. A statistical color transfer algorithm was developed based on standard deviation and mean value to make the entire target image transform to the same color contained within the source image.

The GC transfer method suffers from the problems of artifacts when the source and target images have substantially different color distributions. Output images from the GC transfer method generally do not have acceptable spatial relationships when the target image contains different color regions. When the target image contains two dominant colors (such as "blue sky" and "yellow earth"), the GC algorithm will transfer both of dominant colors to one color (such as red). Accordingly, this makes the output recolored image appear artificial, especially to the human eye. Further, the GC transfer cannot distinguish different image statistics and will frequently mix up image regions.

Different from GC transfer, a local color (LC) transfer takes color correspondences and spatial relationships into consideration. The research about local color transfer can be grouped into three categories: (1) methods with human, (2) methods with segmentation, and (3) example-based methods.

The first category of LC transfer requires human interaction. As one example, Liu et al. introduced a local color method that requires users to set a window to select the color that the algorithm should change. This is disclosed in S. Liu, H. Sun, and X. Zhang, "Selective color transferring via ellipsoid color mixture map," *Journal of Visual Communication and Image Representation*, vol. 23, pp. 173-181, 1 2012. Then, using the statistical information of the selected color of the target image, the Reinhard's color transfer algorithm changes the color.

Using an ellipsoid color mixture map, the content with a similar color to the one in the selection window will be changed, while the other color contents are kept the same. In another LC method, strokes are utilized as a method of interface to indicate what color each color in the target image will be recolored to. This method is discussed in C.-L. Wen, C.-H. Hsieh, B.-Y. Chen, and M. Ouhyoung, "Example-based Multiple Local Color Transfer by Strokes," *Computer Graphics Forum*, vol. 27, pp. 1765-1772, 2008. However, these LC methods are still used to do one single color transfer at one time.

To solve the "one color" problem discussed above, a second category of local color transfer methods use a region segmentation procedure to retain spatial coherence and extract the dominant color information. This method is discussed in T. Yu-Wing, J. Jiaya, and T. Chi-Keung, "Local color transfer via probabilistic segmentation by expectation-maximization," in *Computer Vision and Pattern Recognition*, 2005. *CVPR 2005. IEEE Computer Society Conference on*, 2005, pp. 747-754 vol. 1.

Tai et al. previously utilized an expectation-maximization scheme to do probabilistic segmentation for local color transfer. Using the color information of each segmentation from the target image and source image, the color transfer is processed individually to recolor each segmentation.

Another LC transfer method using dominant colors is discussed in J.-D. Yoo, M.-K. Park, J.-H. Cho, and K. H. Lee, "Local color transfer between images using dominant colors," *Journal of Electronic Imaging*, vol. 22, pp. 033003-033003, 2013. Here, the dominant color information is first extracted from both the target image and the source image. Next, a mapping function is constructed for each dominant color in the target image, where each target color is mapped to one of the dominant colors in the source image. In this procedure, the method requires an additional adjustment process for the color transfer, since doing statistical multiple color transfer will generate artificial edges. Summarily, the core statistical color transfer is straight-forward, but has difficulties with edges and tends to change the luminance distribution (e.g. a dark color is undesirably transferred into a lighter color).

Accordingly, there are two main drawbacks for the first two kinds of color transfer algorithms: (1) artifacts (fake edges), and (2) undesired luminance changes.

Additionally, some existing algorithms will generate fake information after the color transfer. This results from the similar color pixels in the target image that are then mapped to highly different colors. In the target image, the color changes gradually and thus there is no evident color edge. However, after recoloring, noticeable fake edge information is generated.

The luminance change problem results from some existing color transfer algorithms doing the color transfer in the luminance plane. This makes the target image recolored to some output images with poor luminance and loss of content information. In many cases, the loss of content is apparent.

The third category of LC transfer, example-based methods, is discussed in A. Bugeau, T. Vinh-Thong, and N. Papadakis, "Variational Exemplar-Based Image Colorization," *Image Processing, IEEE Transactions on*, vol. 23, pp. 298-307, 2014 as well as X. Yi, W. Liang, L. Chi-Sing, L. Yu-Kun, and W. Tien-Tsin, "Example-Based Color Transfer for Gradient Meshes," *IEEE Transactions on Multimedia*, vol. 15, pp. 549-560, 2013. The idea behind these example-based algorithms is that image sections with similar structure information should share similar color information. Hence, for each section in the target image, the algorithms search all the sections in the source image to find the sections with a similar structure, and accordingly utilizes the color information of these similar sections to execute the coloring/recoloring. However, these methods have three main drawbacks. First, the source image must share similar content with the target image (e.g. both images are landscape images). Second, the sections in the source image having similar structure information must have a similar color. Third, these methods typically require high computational cost.

The present disclosure overcomes the above described problems associated with traditional color transfer systems and methods. The present disclosure includes Human Imperceptible Computerized (HIC-based) color transfer systems and methods for, or for use in, coloring grayscale images and videos, recoloring color images and videos, and generating sequences of color images and videos.

In some aspects, the present disclosure provides improved techniques and computer algorithms for coloring a grayscale image with source colors. The present disclosure may turn one grayscale image into colorful images. The present disclosure may recolor a colorful target image to have another color distribution. As a non-limiting example, a picture of a tree in summer may be recolored to appear as an autumn tree.

In another aspect, the present disclosure provides improved techniques, and computer algorithms for generating an image sequence with an input image and more than one source image. The image sequences generated by the systems/methods depict the change of source color. As one non-limiting example, the image sequences can present a tree picture taken in summer to be one colored as in spring, then change to one colored as in summer, followed by autumn and by winter. This example image sequence shows gradual color changes in the tree picture. As another non-limiting example, a clothing designer can explore the different color effects in a particular design by generating a design image sequence—as opposed to manufacturing the design in each desired color.

In one aspect of the present disclosure, the systems and methods consider the properties of human perception, including non-linear sensitivity to different levels of luminance. Accordingly, the disclosed arithmetic operations are processed and replaced by the parametrical logarithmic image processing (PLIP) operations. It has been shown that the key mathematical properties of the logarithmic image processing calculus have similarities with Human Imperceptible Computerized (K Panetta, S Agaian, Y Zhou, E J Wharton, Parameterized logarithmic framework for image enhancement, IEEE Transactions on Systems, Man, and Cybernetics, Part B (Cybernetics) 41 . . . pages 460-473, 2011; E Wharton, S Agaian, K Panetta Comparative study of logarithmic enhancement algorithms with performance measure, Electronic Imaging 2006, 606412-606412-12).

The present disclosure may utilize the following five aspects: (1) a probabilistic color transfer model, (2) an automatic multi-color mapping algorithm, (3) a generalized HIC-based color transfer system, (4) a parametrical logarithmic image processing operation, and (5) a Logarithmic Gaussian Mixture Model. Unlike existing methods which transfer the color pixel-by-pixel using single pieces of color information from the source image, the presently disclosed HIC-based color transfer systems and methods aim to transfer color in a target image using a combination of different pieces of color information obtained from a source image. The weight of each piece of color information within the combination may be calculated by a probability matrix of the processed color pixel in the target image belonging to each corresponding section. The presently disclosed model addresses the challenging issue of target image areas that exhibit gradual color changes.

All the traditionally used arithmetic operations (including addition, subtraction, and multiplication) may be replaced by the parametrical logarithmic image processing (PLIP) operations. This replacement may enable the human imperceptible computerized system's abilities to distinguish between useful and extraneous data. Weber-Fechner's Logarithmic Law asserts that the human eye is sensitive to the intensity variation between an object and the background, divided by the background intensity. This Law quantifies the minimum change that is regarded as contrast in human imperceptible computerized systems.

Different background luminance has the minimum change needed to be detected as contrast in human imperceptible computerized systems. Background luminance ranges may be divided into three regions to approximate closely. To make the image processing more accurate with respect to human imperceptible computerized systems, the PLIP model was introduced by K. Panetta, S. Agaian, Y. Zhou and E. J. Wharton, "Parameterized Logarithmic Framework for Image Enhancement," in *IEEE Transactions on Systems, Man, and Cybernetics, Part B (Cybernetics)*, vol. 41, no. 2, pp. 460-473, April 2011. The PLIP arithmetic operations are shown below in Table I. There are four parameters that can be set and trained for a PLIP system. When $\in(E)$, $\psi(E)$, and $\gamma(E)$ all approach infinity, the PLIP operators approach the traditional arithmetic operations.

TABLE I

PLIP Arithmetic Operation

| Traditional Arithmetic Operations | PLIP Operations |
|---|---|
| | $g(i, j) = \epsilon(E) - f(i, j)$ |
| Addition | $g_1 \tilde{\oplus} g_2 = g_1 + g_2 - \dfrac{g_1 g_2}{\gamma(E)}$ |
| Substraction | $g_1 \tilde{\ominus} g_2 = \psi(E)\dfrac{g_1 - g_2}{\psi(E) g_2}$ |
| Multiplication with constant (c) | $c \tilde{\otimes} g_1 = \gamma(E) - \gamma(E)\left(1 - \dfrac{g_1}{\gamma(E)}\right)^c$ |
| Summation | $\sum_{1 \leq j \leq K} \tilde{A}_j = \left(\ldots\left((A_1 \tilde{\oplus} A_2) \tilde{\oplus} A_3\right) \ldots \tilde{\oplus} A_K\right)$ |
| Mean value | $\tilde{\mu}(A) = \dfrac{1}{H} \sum_{1 \leq j \leq H} \tilde{A}_i$ |
| Standard deviation | $\tilde{\sigma}(A) = \sqrt{\dfrac{1}{H} \sum_{1 \leq j \leq H} \left(A_i \tilde{\ominus} \tilde{\mu}(A)\right)^2}$ |

(f(i,j) is the original image intensity, g(i,j), $g_1$, $g_2$ are the gray tone functions, parameters $\in(E)$, $\psi(E)$, and $\gamma(E)$ are functions of E that can be trained for the system)

FIG. 1 shows a non-limiting HIC-based color transfer method 1000 according to the present disclosure. At process block 1050, a target image may function as an input into the color-transfer system. Next, at process block 1100, dominant source colors may be input into the color-transfer system. The dominant source colors may be defined by a respective color number at process block 1150. The target image may be transformed, as necessary, via a color model at process block 1200. Next, the target image may be divided into sections at process block 1250. At process block 1300, a color map may be constructed. Once the color map is constructed, a color transfer may occur to the target image at process block 1350. Once the color transfer is complete, the target image may be transformed via an inverse color model at process block 1400. The process blocks shown in FIG. 1 will be described in greater detail below, with reference to subsequent figures.

The disclosed process for inputting dominant source colors can be broken into two main areas: (1) color source option, and (2) source color extracting.

In some aspects, the color source may come from manually extracted dominant source colors. In other aspects, the color source may come from automatically extracted dominant source colors. More specifically, the present disclosure may have two options to extract dominant source colors. One option may be to select the dominant source colors manually (e.g. from a color palette). Another option may be to use an automatic computer algorithm to extract the dominant source colors from a source color image. Users may use either option to select the source of dominant colors.

In some aspects, when users select the option of manual extraction, the computer system may show a color palette, and users may choose the dominant source colors by clicking the corresponding color block in the color palette display (for example, a window may pop up that contains the color palette). Then, the information of the selected dominant source colors may be used in the probabilistic color transfer block.

In some aspects, when users select the option of automatic extraction, the computer system may need the user to upload a source color image file (accordingly, the system may prompt the user to upload an image file). For the uploaded color image file, a color-based image segmentation method may be applied to divide the image into different segments. The image segmentation may be any existing or newly designed image segmentation method. The segmentation method may be color-based image segmentation. Here, the segments may be processed using segment integration to make the number of segments equal to a default number, or a number set by a user. In some situations, it may be beneficial to divide the target image into two or three regions. After the image segmentation, the dominant source color information may be calculated. This calculation may be achieved by a variety of methods, including but not limited to, the mean value of color information in each segment and/or the median value of color information in each segment.

Figure 2A:
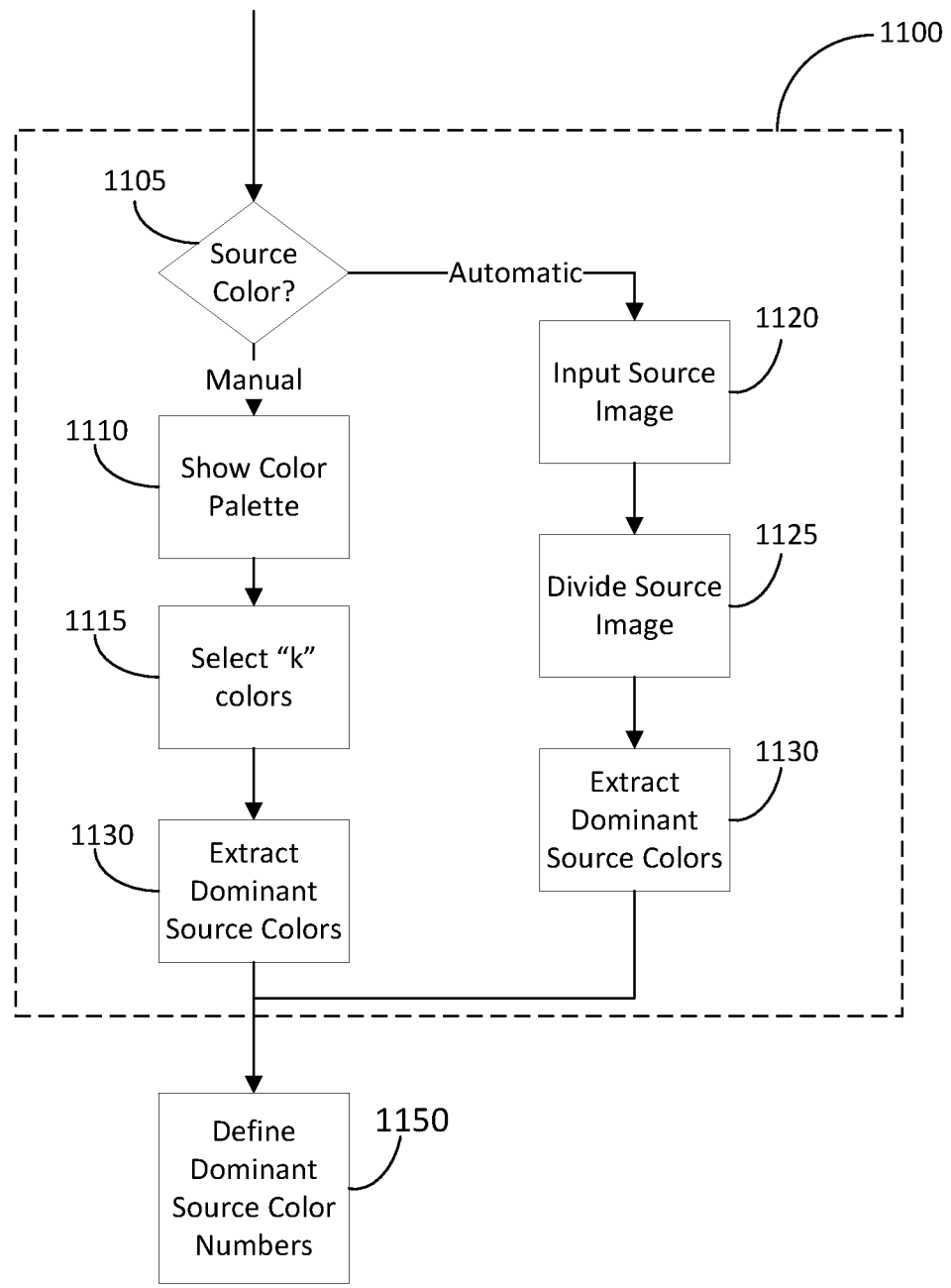
FIG. 2A is a flow diagram illustrating a sub-method of FIG. 1 corresponding to inputting a source color.
Figure 2B:
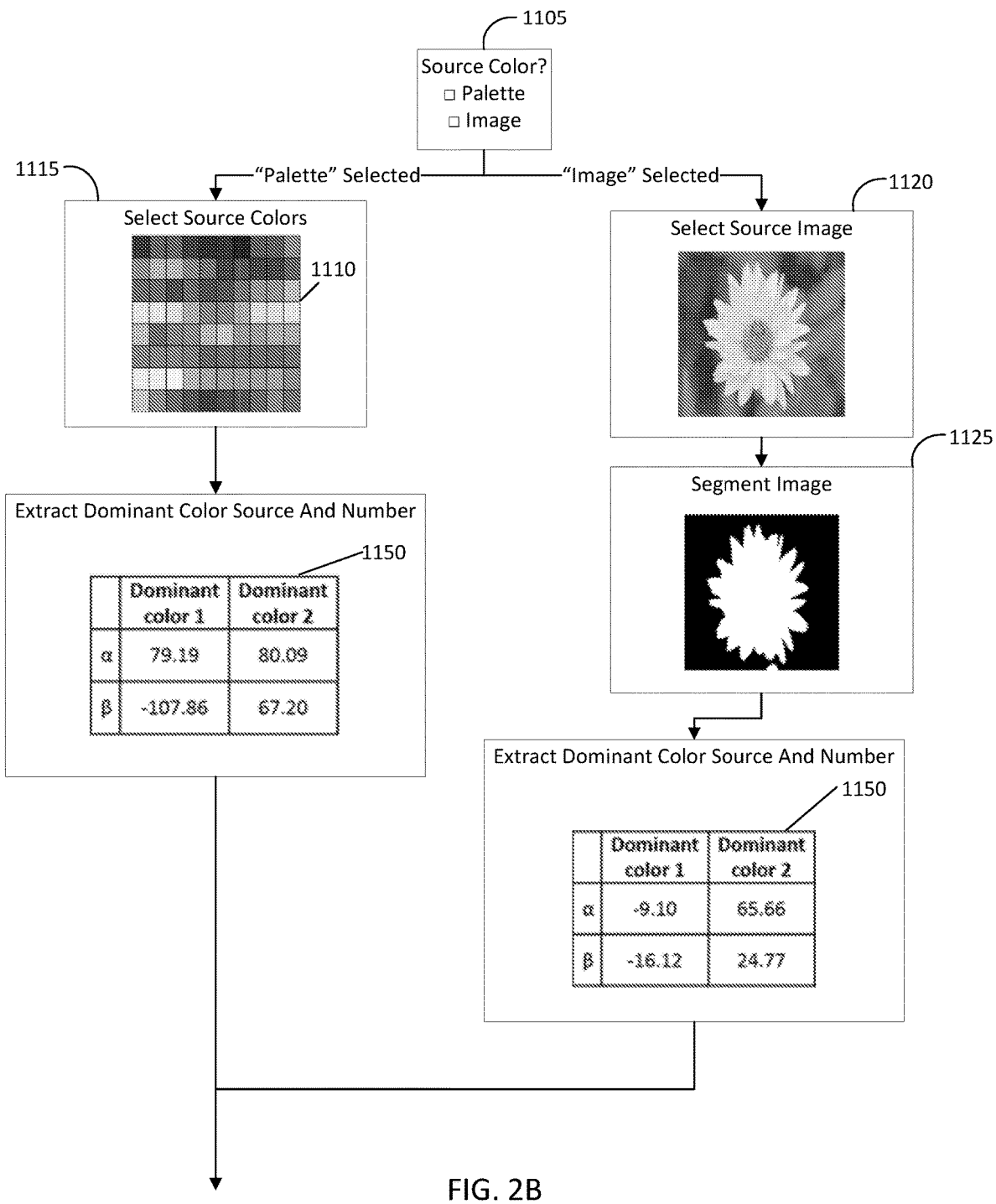
FIG. 2B is a non-limiting example system implementing the sub-method of FIG. 2A.

FIGS. 2A and 2B show a sub-method and system corresponding to selecting a source color option and dominant source colors. Process block 1100 may be further described by FIG. 2A. At process block 1105, a user may decide if the selection of source colors will be automatic or manual. If the user decides to do manual selection, a color palette may be shown at process block 1110. The user may then select a "k" number of dominant source colors at process block 1115. After the dominant source colors are selected, the dominant source colors may be extracted from the color palette at process block 1130. Next, process block 1150 may define the dominant source color numbers.

Alternatively, the user may decide to do automatic selection, and a source image may be used as an input at process block 1120. Next, the source image may be segmented/divided at process block 1125. Once segmented, the dominant source colors may be extracted at process block 1130. As with above, the dominant source color numbers may then be defined at process block 1150.

FIG. 2B shows a non-limiting example demonstrating the selection of a source color option and the associated dominant source colors. Here, a color palette may be presented to a user for color selection. Next, a table may display the color numbers a, 13 associated with the dominant source colors. Alternatively, a selected source image may be segmented and the table may display the color numbers associated with those dominant source colors.

In some aspects, the present disclosure may extract a color information component and a luminance component individually. By color model transformation, the further probabilistic color transfer equation may be applied to the color information component of a target image and retain the luminance component. Dividing color information and luminance may address luminance change between the target image and the output image, which is one of the drawbacks of existing color transfer algorithms.

Since the probabilistic color transfer equations may only be applied to the color information component, the images may be processed using a color model transformation to ensure that the color information component and the luminance component remain independent.

The color model applied after the color model transformation may be any existing color model, wherein color component and luminance component are independent. These color model examples include $CIEL\alpha\beta$, YCrCb, and any other color model where color components and luminance components are independent.

After being processed according to the present disclosure, a corresponding inverse color model transformation may be applied to return the color model of the original input target image. This inverse color model transformation may ensure that the input and output images share the same color model.

Figure 3:
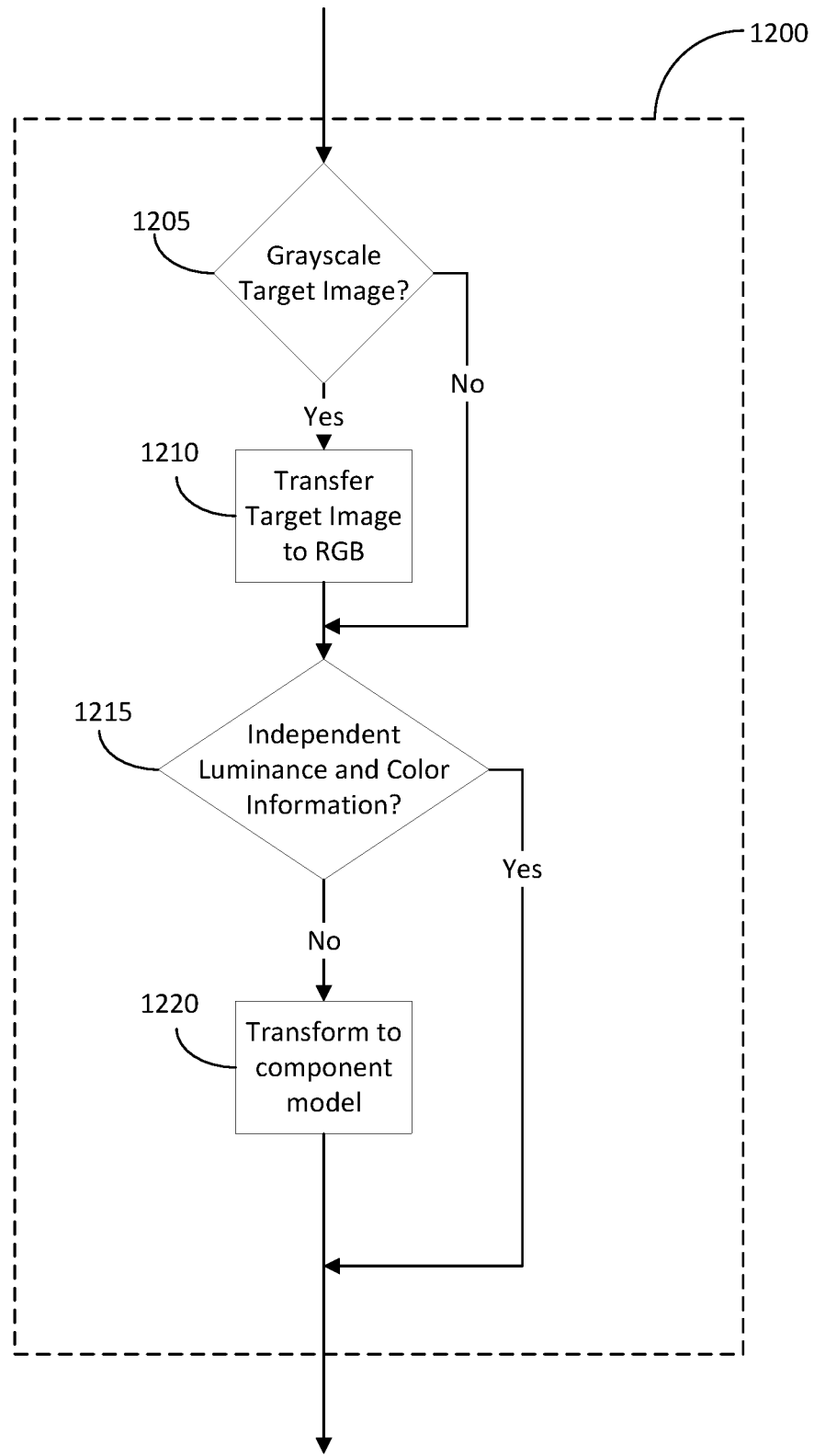
FIG. 3 is a flow diagram illustrating a sub-method of FIG. 1 corresponding to transforming via a color model.

FIG. 3 shows the sub-method of FIG. 1 corresponding to transforming the target image via a color model. In some aspects, process block 1200 may be further described. At process block 1205, the computer system may determine if the target image is a grayscale image. If the target image is grayscale, the target image may be transferred to a color model at process block 1210 (for example, an RGB model). If the target image is not grayscale, the target image may not be transferred to another color model. At process block 1215, the computer system may determine if the target image has independent luminance and color information. If the target image does not have independent luminance and color information, then the target image may be transformed to a component model at process block 1220. The component model may have independent luminance and color information components. If the target image already has independent luminance and color information, a transformation as described may not occur.

In some aspects, the process for image segmentation may be broken into four categories: (1) logarithmic K-means method, (2) logarithmic GMM method, (3) Logarithmic K-means method with missing Data, and (4) Other methods to split image into similar segments.

For a grayscale input target image, the image segmentation may be any existing or new method. For a grayscale input target image, the image segmentation may only utilize the luminance information of the target image.

For a color input target image, the image segmentation may be any existing or new method. For a color input target image, the image segmentation may only utilize the color information of the target image.

These image segmentations may be implemented by data classification and other image segmentation methods, such as graph-oriented methods, mean-shift algorithms, Watershed segmentation, and partial differential equation-based methods. Here, two examples are provided. However, the image segmentation is not limited to these two examples. In the following non-limiting example, the number of segments after image segmentation is equal to the number of dominant colors, which may be manually chosen or automatically decided via algorithms.

In some aspects, a logarithmic K-means method may be used to segment the image. One way to do image segmentation may be to utilize existing clustering techniques in machine learning, such as K-means. The classical K-means may be utilized to set large sample data into different K clusters. This classical K-means may be improved to be a logarithmic K-means method.

In one aspect of the present disclosure, logarithmic K-means may be used to extract the domain colors of a source image. The method input may include the sample data matrix and K setting. The number of similar segments may be selected manually or automatically. The output of the logarithmic K-means method is an index matrix with the same size of sample data and in the range of [1, K]. The algorithm of logarithmic K-means may be shown in an iteration process of three steps.

In the first step, for a given cluster assignment C, find the observation in the cluster minimizing the total distance to other points in that cluster:

$$i_k^* = \arg\min_{\{i: C(i)=k\}} \sum_{C(j)=k} \tilde{d}(x_i, x_j) \tag{1}$$

Where, C is the two-dimensional data with size of $2*(w_S l_S)$ by individually scanning the pixel values in $\alpha$ and $\beta$ planes of colorful source image with size of $w_S * l_S$ from left to right and up to down. $d(x_i, x_j)$ is any distance measure. As an example here, it may be a Euclidean distance.

$$d(x_i, x_j) = \|x_i \tilde{\ominus} x_j\|^2 \tag{2}$$

Where, $m_k = x_{i^*_k}$, k=1, 2, . . . , K

In step 3, for a set of cluster centers $\{m_1, \ldots, m_k\}$, the total error can be minimized by assigning each observation to the closest (current) cluster center:

$$C(i) = \arg\min_{1 \le k \le K} d(x_i, m_k) \tag{3}$$

After repeating steps 1, 2, and 3, the Logarithmic K-means method is to find:

$$\arg\min_S \sum_{1 \le i \le K} \sum_{\mathbb{X} \in S_i} \|\mathbb{X} \tilde{\ominus} \tilde{\mu}_i\|^2 \tag{4}$$

Where, $\mathbb{X} = [\mathbb{X}_1, \mathbb{X}_2, \ldots, \mathbb{X}_n]$ is the large sample date, which will be grouped into K sets $S = [S_1, S_2, \ldots, S_k]$.

In one aspect of the present disclosure, a logarithmic Gaussian Mixture Model (GMM) method may be utilized for data clustering to achieve image segmentation.

To consider the non-linearity of human imperceptible computerized systems, the Logarithmic Gaussian Mixture Model is proposed as a variation of Gaussian Mixture Model with Parameterized Logarithmic Framework. By replacing the linear arithmetic operations (addition, subtraction, and multiplication) with nonlinear parameterized logarithmic image processing (PLIP) operations, the disclosed Logarithmic GMM method accurately characterizes the nonlinearity of computer image. The Logarithmic Gaussian Mixture Model is defined as a weighted PLIP sum of the individual Logarithmic Gaussian probability density function:

$$p(C_i) = \sum_{1 \le j \le K} \alpha_j \tilde{\otimes} g(C_i, \tilde{\mu}_j, \tilde{\sigma}_j) \tag{5}$$

Where, $\alpha_1$ are the mixture weight trained by the system.

$$g(T_i^1, \tilde{\mu}_j, \tilde{\sigma}_j) = \frac{1}{\sqrt{2\pi\tilde{\sigma}_j^2}} \exp\left(\frac{-(T_i^1 \tilde{\ominus} \tilde{\mu}_j)^2}{2\tilde{\sigma}_j^2}\right) \tag{6}$$

Where, $\tilde{\mu}_j$ is the PLIP mean value of each region and $\tilde{\sigma}_j$ is the PLIP standard deviation of each region.

The algorithm of Logarithmic GMM may be described by five steps. In the first step, initialize the PLIP means $\tilde{\mu}_j$, standard deviation $\tilde{\sigma}_j$, and mixture weight $\alpha_1$. In the second step (called E step), the responsibilities are evaluated by using the current parameter values and Logarithmic Gaussian mixture model in Eqn. (5). In the third step (called M step), the parameters will be re-estimated using the current responsibilities.

$$\tilde{\mu}_j^{new} = \frac{1}{N_j} \sum_{1 \le i \le w_S l_S} p(C_i) \tilde{\otimes} C_i \tag{7}$$

$$\tilde{\sigma}_j^{new} = \sqrt{\frac{1}{N_j} \sum_{1 \le i \le w_S l_S} p(C_i) \tilde{\otimes} \|C_i \tilde{\ominus} \tilde{\mu}_j^{new}\|^2} \tag{8}$$

$$\alpha_j^{new} = \frac{N_j}{w_S l_S} \tag{9}$$

Where, $$N_j = \sum_{1 \le i \le w_S l_S} p(C_i) \tag{10}$$

In the fourth step, the log likelihood will be evaluated.

$$\ln p(C \mid \alpha, \tilde{\mu}, \tilde{\sigma}) = \sum_{1 \le i \le w_S l_S} \ln \left\{ \sum_{1 \le j \le K} \alpha_j \tilde{\otimes} g(C_i, \tilde{\mu}_j, \tilde{\sigma}_j) \right\} \tag{11}$$

In the fifth step, if the standard variation of either the parameters or the log likelihood is satisfied by the presetting threshold, this algorithm will end. Otherwise, it will go back to step 2 (E step).

In many real applications, missing data is common. To do the image segmentation with some missing data, a new K-means method with partially observed data (K-POD) was proposed in Jocelyn T. Chi, Eric C. Chi, and Richard G. Baraniuk, "k-POD: A Method for k-Means Clustering of Missing Data," The American Statistician, Vol. 70, Iss. 1, 2016. In the same way as improving K-means and GMM via the present disclosure, K-POD may be improved to Logarithmic K-POD by replacing some arithmetic operations with PLIP operation.

In another aspect of the present disclosure, other methods to achieve image segmentation include grouping by matching to find similar segments to the reference segment. The users or computer may select the target segment to process manually or automatically in the target image. Then, by searching through the whole image, other similar segments will be found. The similar segments may share similar structural or statistical information. After searching all the segments in the image, all the similar segments to the target segment may be extracted and processed further.

For data classification methods to achieve image segmentation, the number of segments in an input target image may be preset by users. For other image segmentation methods, the number of segments after segmentation may vary and, in some situations, be larger than a user's setting. Accordingly, a segment integration process may be introduced to integrate the segments and thus reduce the number of segments and corresponding dominant target colors. The algorithm of segment integration may be processed to combine close dominant target colors as one to reduce the number of segments until it reaches the set number of segments.

For each region in the target image, some dominant color information may be collected for subsequent steps. In some aspects, the dominant color information may be the mean value and standard deviation of each segment. However, dominant color information may not be limited to these previous two types. As an example, the present disclosure may also use median value or tri-median value.

Figure 4:
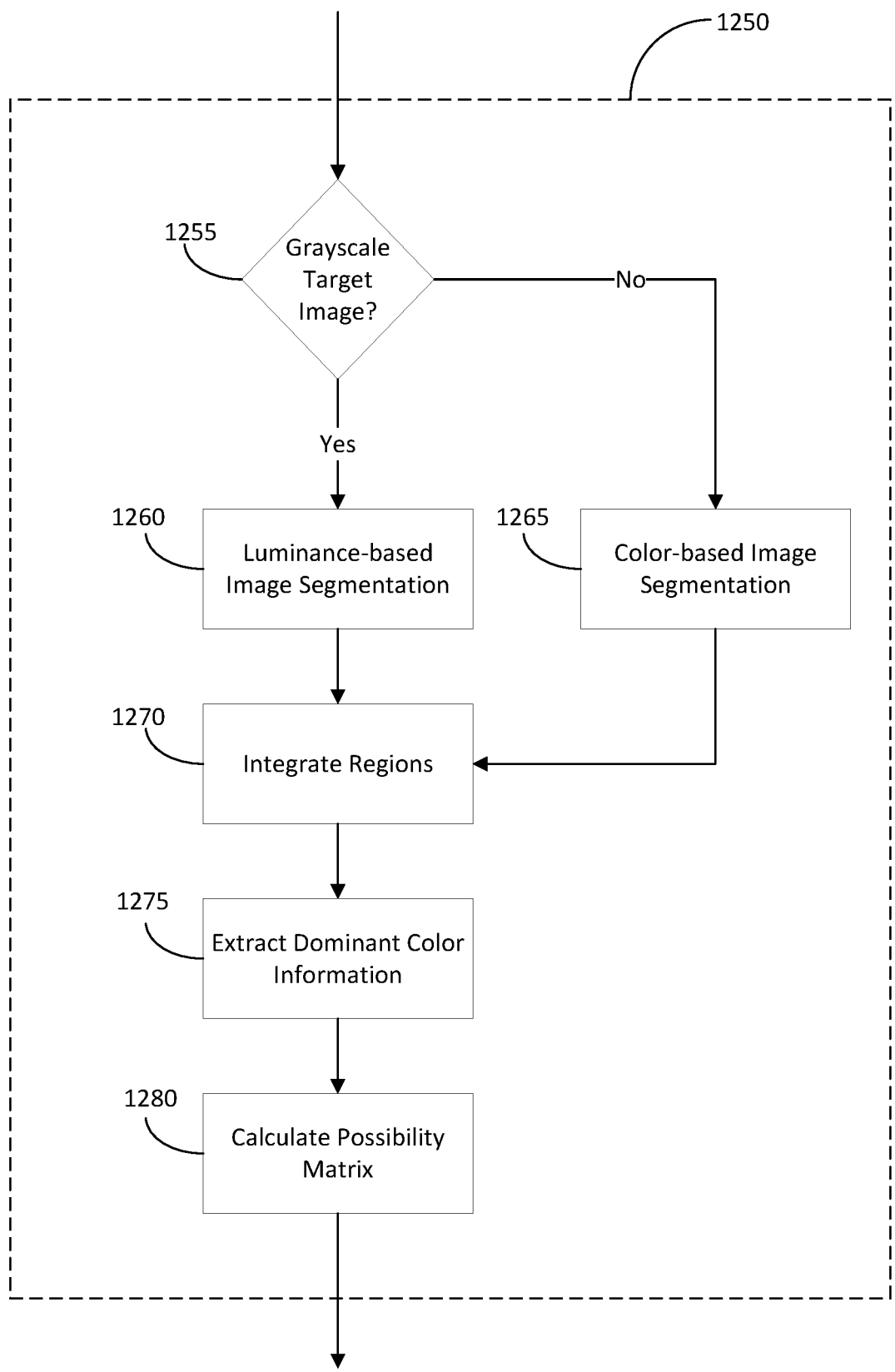
FIG. 4 is a flow diagram illustrating a sub-method of FIG. 1 corresponding to dividing an image.

FIG. 4 shows a sub-method of FIG. 1 corresponding to segmenting/dividing an image. In some aspects, process block 1250 may be further described. At process block 1255, the computer system determines if the target image is grayscale. If the target image is grayscale, the target image may be segmented based on luminance information at process block 1260. If the target image is not grayscale, the target image may be segmented based on color information at process block 1265.

Still referring to FIG. 4, regions of the target image may be integrated (according to the above description) at process block 1270. Once integrated, the dominant color information may be extracted from the target image at process block 1275. Then, a possibility matrix may be calculated at process block 1280.

To achieve the probabilistic color transfer, possibility matrix generation may provide the possibility information of each pixel in a target image. Here, various probabilistic models may be utilized to calculate the possibility of each pixel belonging to each segment after image segmentation. These various probabilistic models may be the Gaussian distribution model, the Beta distribution model, the Log-normal distribution model, the Dirac delta function, the truncated normal distribution model, and other possibility distribution models. When the possible distribution model is the Bernoulli distribution model, this color transfer algorithm will be the traditional color transfer algorithm in E. Reinhard, M. Adhikhmin, B. Gooch, and P. Shirley, "Color transfer between images," *IEEE Computer Graphics and Applications*, vol. 21, pp. 34-41, 2001.

As a non-limiting example, the Gaussian distribution model may be utilized to calculate the percentage of each pixel belonging to each segment. This percentage vector matrix has the size of k*($w_T l_T$) as shown in Eqn. (5).

$$P(j,i) = g(T_i^1, \tilde{\mu}_j, \tilde{\sigma}_j) \tag{12}$$

The present disclosure's process for color mapping is described below. Users may manually build the color mapping relationship between dominant source colors and dominant target colors. Alternatively, the system may automatically create a color mapping relationship based on the information of dominant source colors and dominant target colors.

For the manual method, in one aspect, users may manually associate dominant source colors and dominant target colors in a color mapping window to indicate the color mapping relationship. In some situations, it may be beneficial to have the user draw lines (e.g. using the computer system) between desired dominant source colors and dominant target colors.

The present disclosure includes an automatic method. Traditional mapping functions generally have the problem of limited usability of colors from the source images. This often means that the colors in a target image are all mapped to one of the colors in the source image. Accordingly, this results in some colors in the source image not appearing in the target image, thus making the color transfer unsuccessful.

To solve the above problem, the automatic color mapping of the present disclosure may be a bidirectional mapping ($\tilde{\mathcal{M}}$) function, which may find the extracted dominant colors from the source/target image for each dominant color of the target/source image. The optimal $\tilde{\mathcal{M}}$ can be found by Eqn. (13).

$$\arg\min_{\tilde{\mathcal{M}}} \sum_{1 \leq i \leq K} \left\| F\left(C_S^{\tilde{\mathcal{M}}(i)}\right) \tilde{\ominus} F(C_T^i) \right\|^2 \tag{13}$$

Where, $F(C_T^i)$ is a vector for each dominant color in the target image, including two normalized components: (1) ratio of each dominant color, and (2) order of mean distance from each dominant color to the rest of the dominant colors. These orders may be divided by K to be in the same range with ratios of each domain color.

Figure 5:
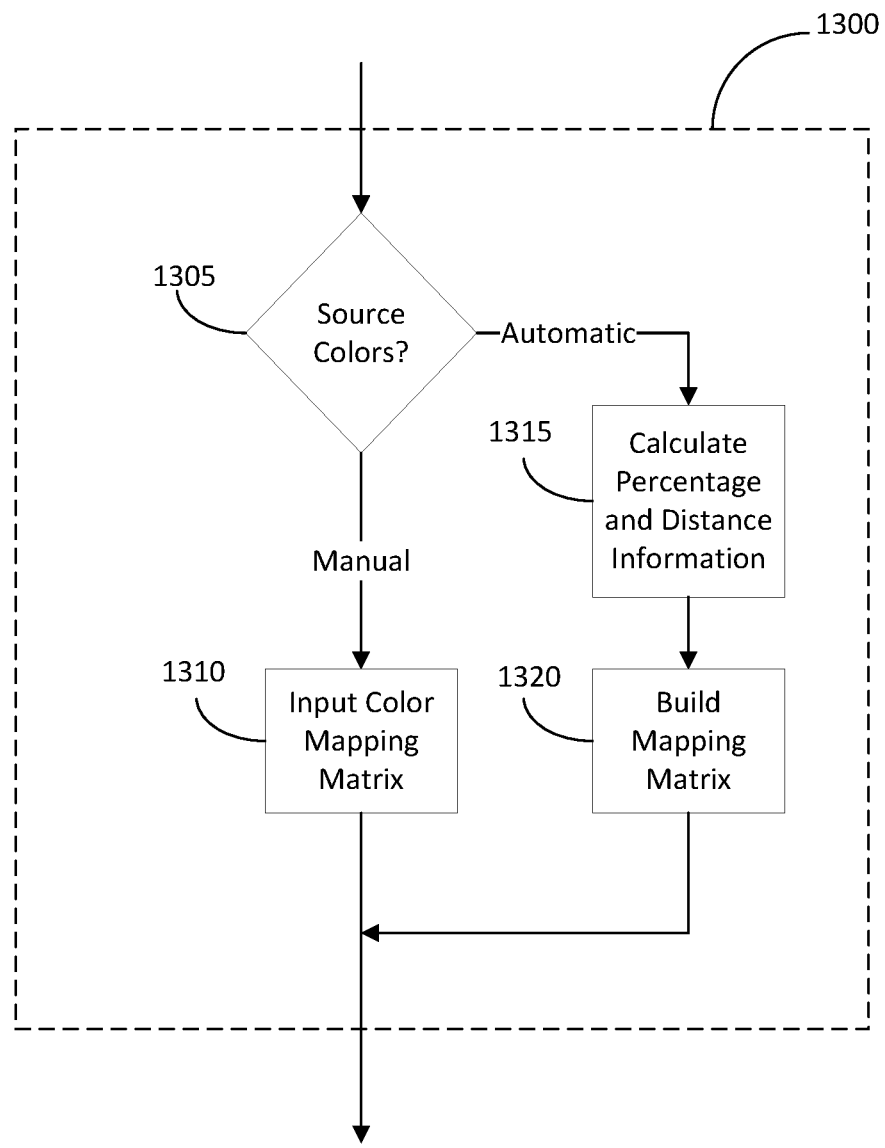
FIG. 5 is a flow diagram illustrating a sub-method of FIG. 1 corresponding to building a color mapping.

FIG. 5 shows a sub-method of FIG. 1 corresponding to building a color mapping. Process block 1300 may be further described. At process block 1305, the computer system may determine if the source color has been automatically input or manually (e.g. by the user). If the source colors were input manually, a color mapping matrix may be input at process block 1310. If the source colors were input automatically, percentage and distance information (as described above), may be calculated at process block 1315. Once calculated, a color mapping matrix may be built at process block 1320.

Figure 6:
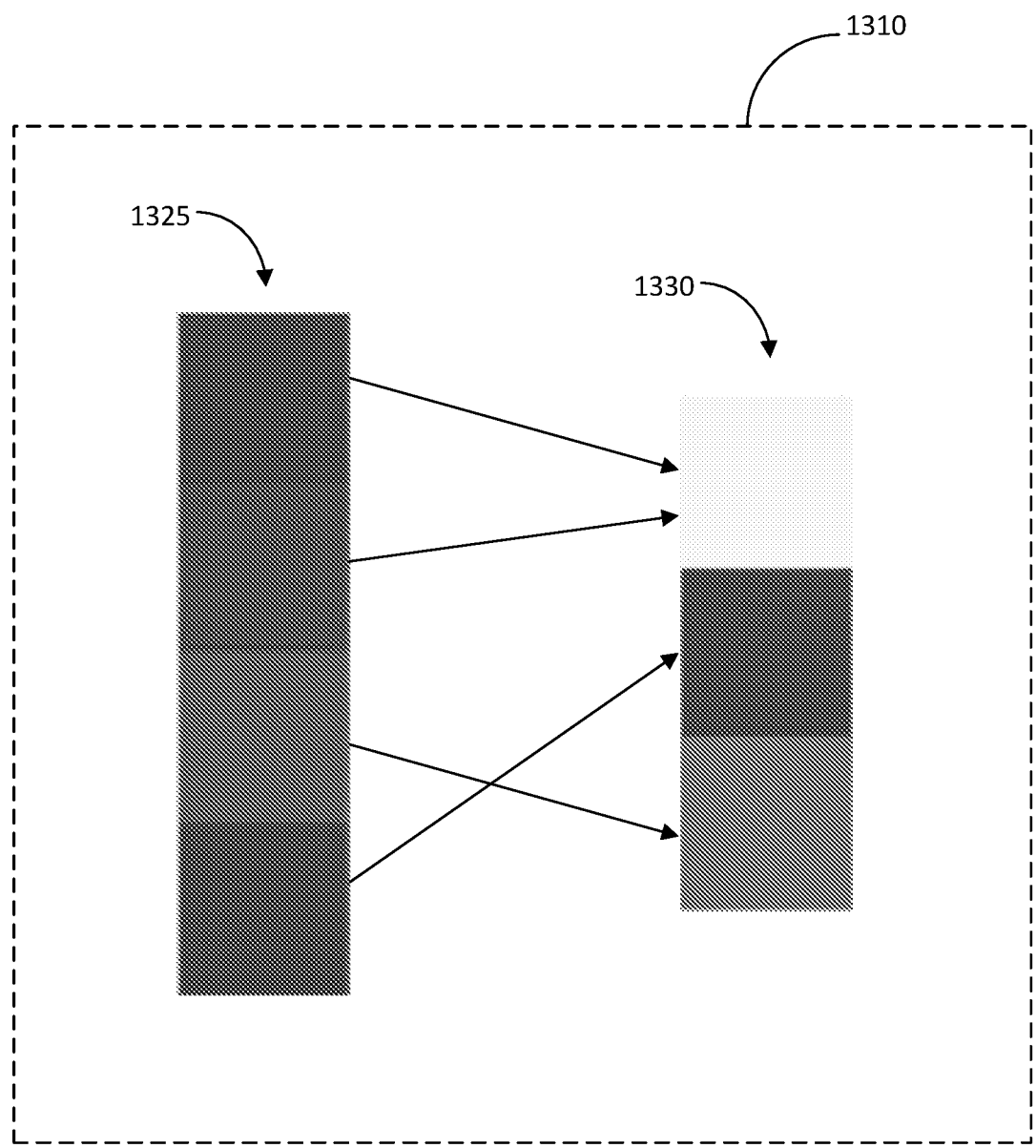
FIG. 6 is a non-limiting example of the color mapping sub-method of FIG. 5.

FIG. 6 shows a non-limiting example of a color mapping matrix as constructed by a user. Here, source colors 1330 may be selected manually by a user. Then, target colors 1325 may be manually mapped to the source colors 1330 by the user. The manual mapping may be facilitated via the computer system.

Figure 7:
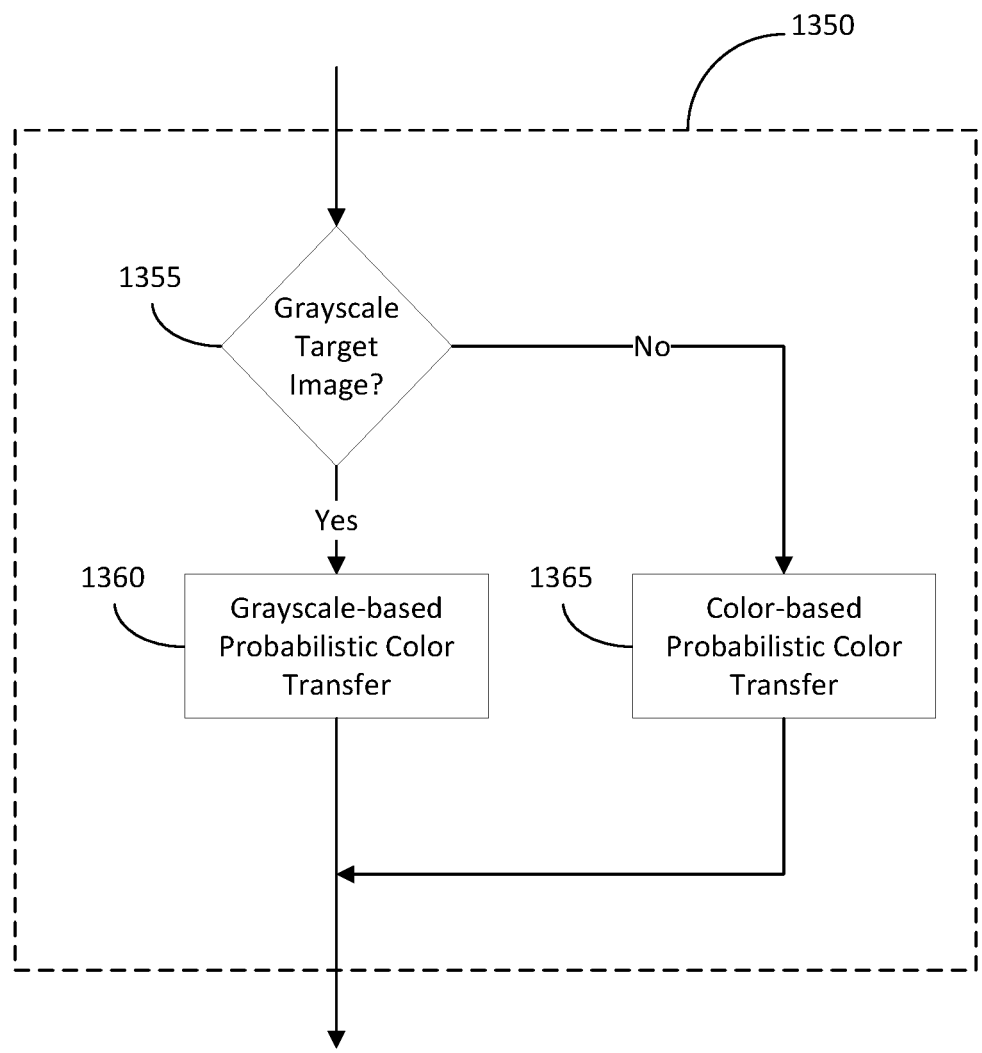
FIG. 7 is a flow diagram illustrating a sub-method of FIG. 1 corresponding to performing a color transfer.

In one aspect, the technology in the present disclosure may color a grayscale input target image by luminance-based probabilistic color transfer. In another aspect, the system may automatically recolor a color input target image by color-based probabilistic color transfer. This probabilistic color transfer may have two different versions for different types of input target images, as shown in FIG. 7. Here, the color model of CIEL$\alpha\beta$ is utilized as an example. The color model may be other color models whose luminance and color component are independent.

The description of the process will be set forth below according to the following outlines: (1) color-based probabilistic color transfer, and (2) luminance-based probabilistic color transfer.

The color-based probabilistic transfer may be based on the percentage vector matrix (P) calculated by the probability matrix generation. To solve the illumination distribution change of traditional color transfer methods, the color-based probabilistic color transfer may be applied in the $\alpha$ and $\beta$ plane of target image.

$$R_j = \sum_{1 \leq i \leq K} P_i \tilde{\otimes} \left( \frac{\tilde{\sigma}_{S_j}^i}{\tilde{\sigma}_{T_j}^i} \tilde{\otimes} (T_j \tilde{\ominus} \tilde{\mu}_{T_j}^i) \tilde{\oplus} \tilde{\mu}_{S_j}^i \right) \quad (14)$$

Where, $P_i$ is the $i^{th}$ row in P. $T_j$, $S_j$ and $R_j$ are the target, source and recolored image with j=α, β. μ and σ are the PLIP mean value and PLIP standard deviation of each region. For the L plane of the recolored image, it is just the same as the one of the target image as shown in Eqn. (15).

$$R_L = T_L \quad (15)$$

For a grayscale input target image, the standard deviation information of color components for each segment may not be important. Hence, the color-based probabilistic color transfer equation may be modified to be a luminance-based probabilistic color. As shown in Eqn. (16), the luminance-based probabilistic color may be processed using the percentage vector matrix generated by image segmentation and the color mapping function ($\mathcal{M}$(i)).

$$R_j = \begin{cases} \sum_{1 \leq i \leq K} P_i \tilde{\otimes} \tilde{\mu}_{S_j}^{\mathcal{M}(i)}, & j = \alpha, \beta \\ T_L, & J = L \end{cases} \quad (16)$$

Where, $P_i$ is the $i^{th}$ row in P. $S_j$ and $R_j$ are the source and recolored image with j=α, β. For the L plane of the colored image, it is just the same as the one of the target image as shown in Eqn. (16).

Referring to FIG. 7, a sub-method of FIG. 1 corresponding to performing a probabilistic color transfer is shown. Process block 1350 may be further described. At process block 1355, the computer system may determine if the target image is a grayscale image. If the target image is grayscale, a grayscale-based probabilistic color transfer may be implemented at process block 1360. If the target image is not grayscale, a color-based probabilistic color transfer may be implemented at process block 1365.

Figure 8:
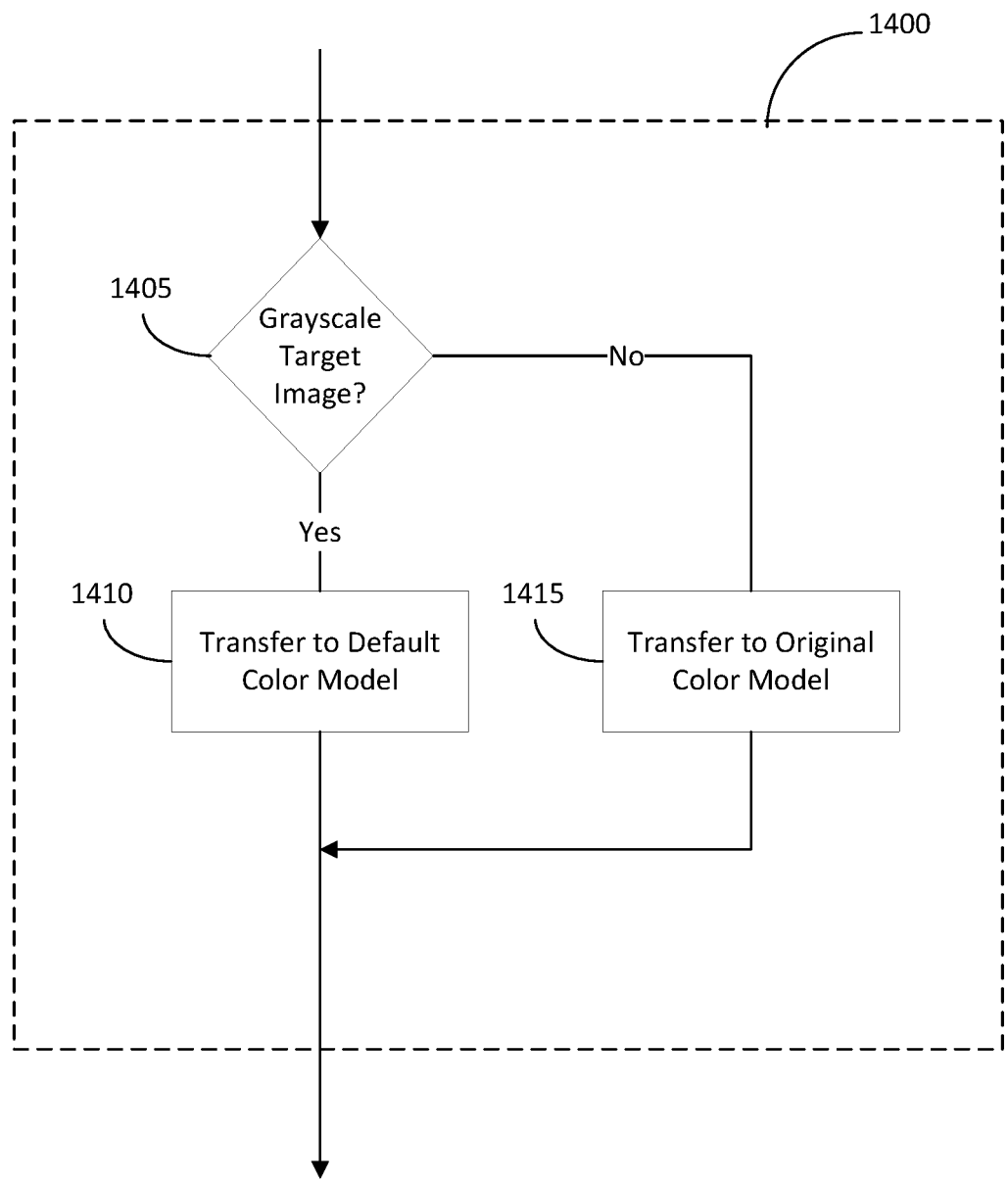
FIG. 8 is a flow diagram illustrating a sub-method of FIG. 1 corresponding to transforming via an inverse color model.

As discussed above, an inverse color model transformation may be applied to transfer the output image into any color model, such as RGB, CIELαβ and other color models. Referring to FIG. 8, a sub-method of FIG. 1 corresponding to performing an inverse color model transformation is shown. Process block 1400 may be further described. At process block 1405, the computer system may determine if the target image is a grayscale image. If the target image is grayscale, the computer system may transfer the output image to a default color model at process block 1410. If the target image is not grayscale, the computer system may transfer the output image to an original color model. The original color model may be associated with the input target image.

Several example applications are provided herein. The applications are not intended to limit the present disclosure to any particular system or method.

Figure 9:
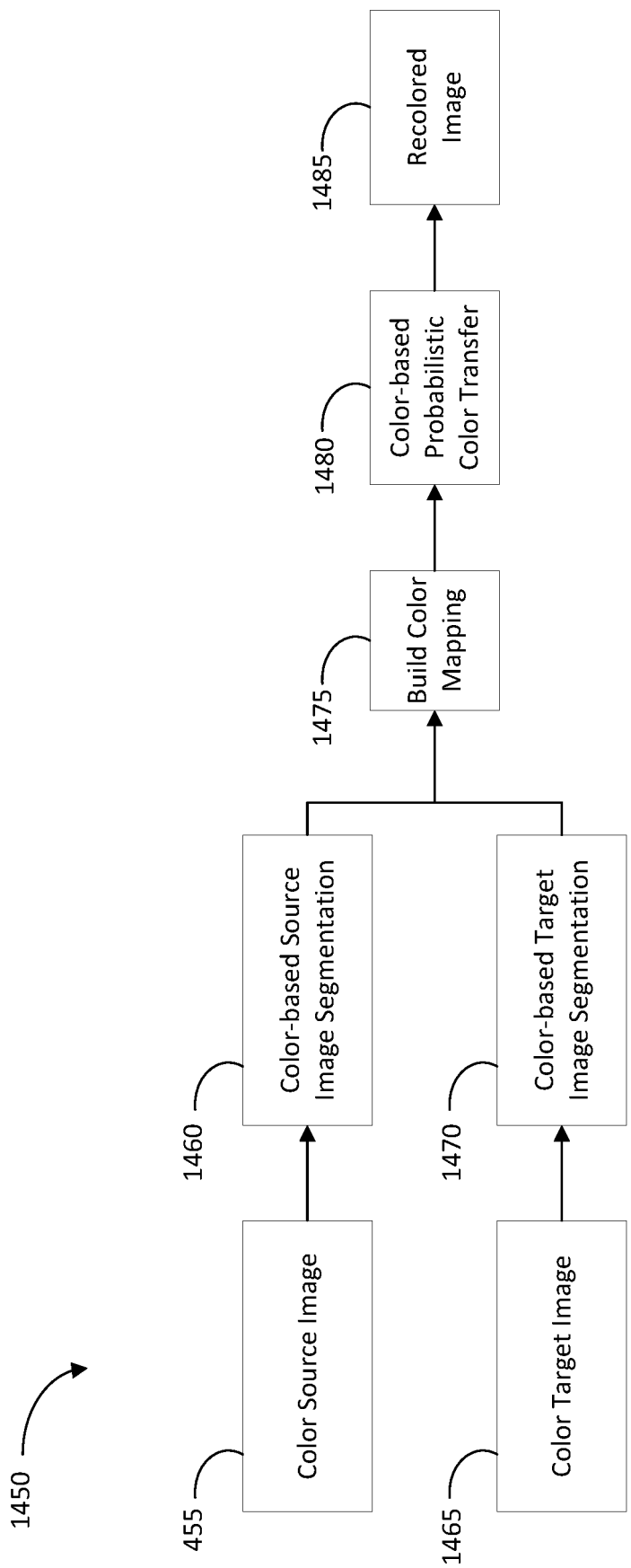
FIG. 9 is a flow diagram of a non-limiting example HIC-based color transfer system and method according to the present disclosure.

FIG. 9 shows one non-limiting HIC-based color transfer system and method according to the present disclosure. Using the system and method 1450 according to the present disclosure, a source image may be utilized to extract the dominant source colors' information by using a color-based image segmentation method. This dominant source colors' information may be further applied in the color-based probabilistic color transfer to recolor the input target image to generate recolored images.

Specifically, at process block 1455, a color source image is input. Similarly, at process block 1465, a color target image is input. At process block 1460, color-based source image segmentation may occur. At process block 1470, color-based target image segmentation may occur. At process block 1475, a color map may be built. Then, at process block 1480, color-based probabilistic color transfer may occur. The resulting recolored image may be output at process block 1485.

Figure 10:
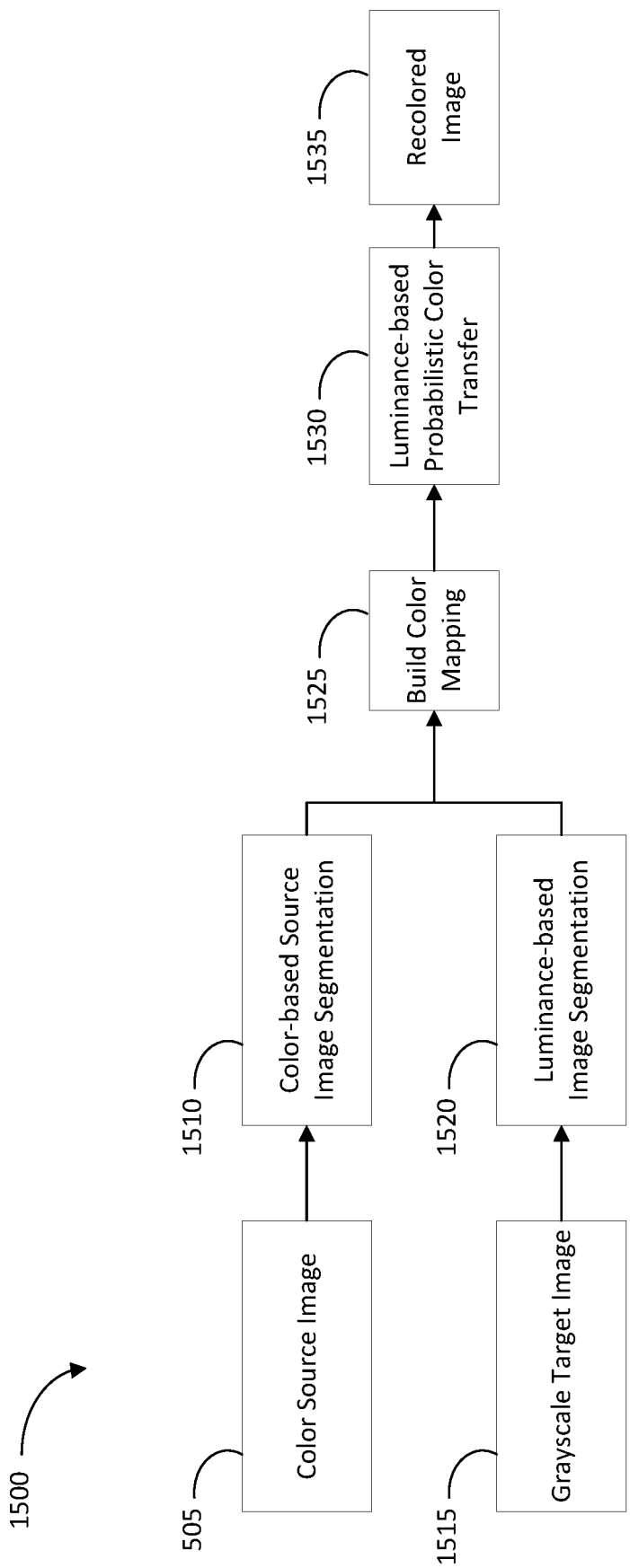
FIG. 10 is a flow diagram of another non-limiting example HIC-based color transfer system and method, using a source image, according to the present disclosure.

FIG. 10 shows another non-limiting HIC-based color transfer system and method, using a source image, according to the present disclosure. Using the system and method 1500 according to the present disclosure, a source image may be utilized to extract the dominant source colors' information by using a color-based image segmentation method. This dominant source color information can be further applied in the luminance-based probabilistic color transfer to recolor the grayscale input target image to generate colored images.

Specifically, at process block 1505, a color source image is input. Similarly, at process block 1515, a grayscale target image is input. At process block 1510, color-based source image segmentation may occur. At process block 1520, luminance-based target image segmentation may occur. At process block 1525, a color map may be built. Then, at process block 1530, luminance-based probabilistic color transfer may occur. The resulting recolored image may be output at process block 1535.

Figure 11:
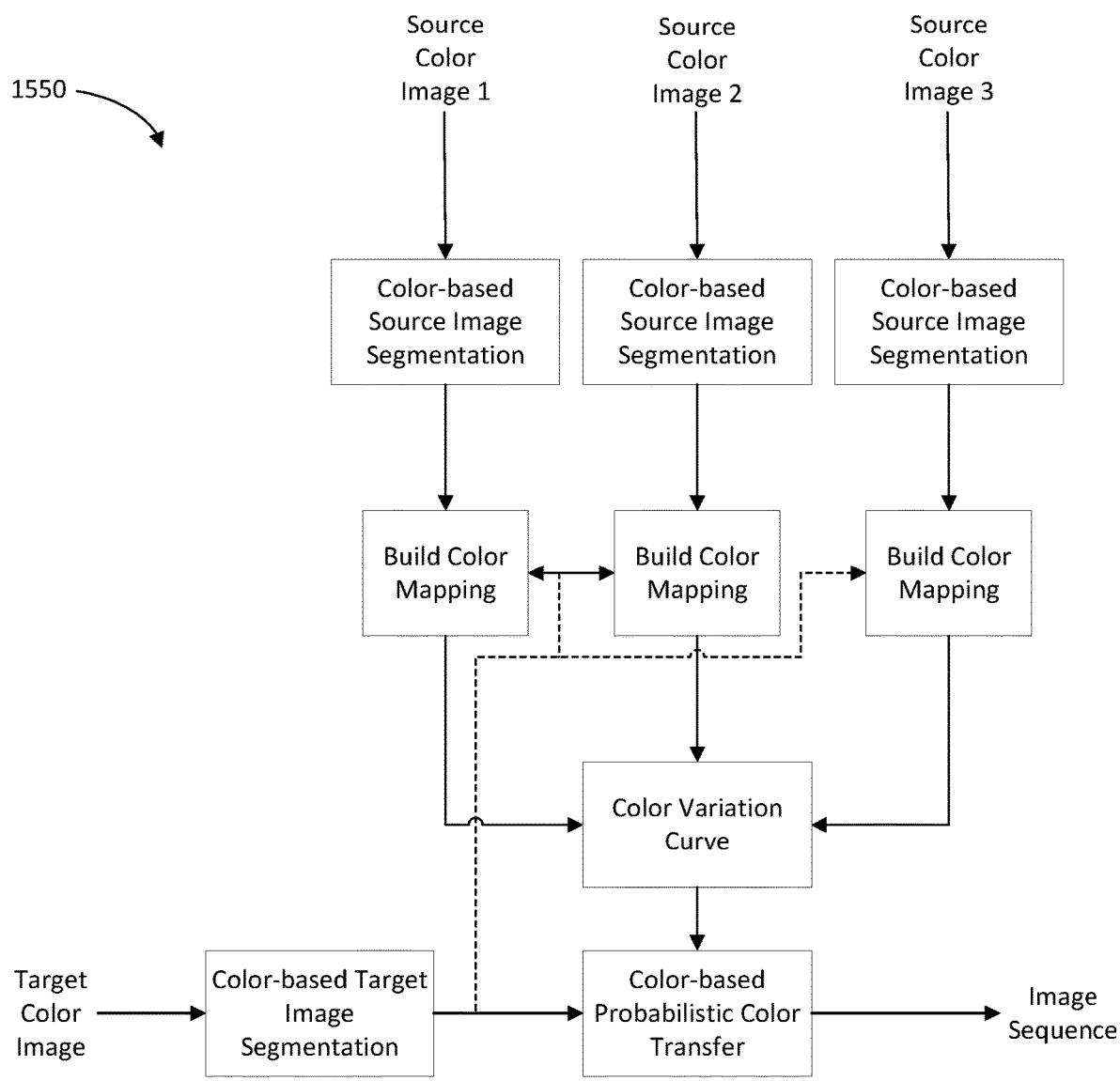
FIG. 11 is a flow diagram of a non-limiting example HIC-based color transfer sequence system and method according to the present disclosure.

FIG. 11 shows another non-limiting HIC-based color transfer system for image sequence generation. This probabilistic image sequence (PIS) system 1550 is an animation process, which may output an image sequence showing the gradually changing color. As an example, it may show the change of animation of a tree image from winter, through spring, and finally to autumn. This may be applied to many applications, including computer animation and video editing. The first, middle ($M^{th}$) and last image ($N^{th}$) in the output image sequence may have three different ambiences from three different source images. The other images in the sequence will present the gradually changing color from one ambience to another ambience.

In this algorithm, after color-based image segmentation and color mapping, $\mu_1^{M_1(i)}$, $\mu_2^{M_2(i)}$, $\mu_3^{M_3(i)}$ and $\sigma_1^{M_1(i)}$, $\sigma_2^{M_2(i)}$, $\sigma_3^{M_3(i)}$ are obtained from three different source images. To make the image sequence have the effect of changing ambiences, the color variation curve may be utilized to calculate the color information ($\mu_S^j$ and $\sigma_S^j$) for probabilistic color transfer of each image in the output image sequence. Here, the two linear color variation curve is shown, which is described in Eqns. (17)-(18).

$$\tilde{\mu}_{S,j}^i = \begin{cases} \dfrac{\tilde{\mu}_2^{\mathcal{M}_2(i)} \tilde{\ominus} \tilde{\mu}_1^{\mathcal{M}_1(i)}}{M-1} (j \tilde{\ominus} 1) \tilde{\oplus} \tilde{\mu}_1^{\mathcal{M}_1(i)} & j = 1, \ldots, M \\ \dfrac{\tilde{\mu}_2^{\mathcal{M}_2(i)} \tilde{\ominus} \tilde{\mu}_3^{\mathcal{M}_3(i)}}{M-N} (j \tilde{\ominus} M) \tilde{\oplus} \tilde{\mu}_2^{\mathcal{M}_2(i)} & j = M+1, \ldots, N \end{cases} \quad (17)$$

$$\tilde{\sigma}_{S,j}^i = \begin{cases} \dfrac{\tilde{\sigma}_2^{\mathcal{M}_2(i)} \tilde{\ominus} \tilde{\sigma}_1^{\mathcal{M}_1(i)}}{M-1} (j \tilde{\ominus} 1) \tilde{\oplus} \tilde{\sigma}_1^{\mathcal{M}_1(i)} & j = 1, \ldots, M \\ \dfrac{\tilde{\sigma}_2^{\mathcal{M}_2(i)} \tilde{\ominus} \tilde{\sigma}_1^{\mathcal{M}_3(i)}}{M-N} (j \tilde{\ominus} M) \tilde{\oplus} \tilde{\sigma}_2^{\mathcal{M}_2(i)} & j = M+1, \ldots, N \end{cases} \quad (18)$$

After getting $j^{th}$ color information, Eqns. (19)-(21) may be used to get the $j^{th}$ image in the output image sequence after being transformed back to the RGB color plane.

$$R_L(j) = T_L \quad (19)$$

$$R_\alpha(j) = \sum_{1 \le i \le K} \tilde{P}_i \tilde{\otimes} \left( \frac{\sigma_{S,j}^i}{\sigma_{T_\alpha}^i} \otimes (T_\alpha^i \ominus \mu_{T_\alpha}^i) \oplus \mu_{S,j}^i \right) \quad (20)$$

$$R_\beta(j) = \sum_{1 \le i \le K} \tilde{P}_i \tilde{\otimes} \left( \frac{\sigma_{S,j}^i}{\sigma_{T_\beta}^i} \otimes (T_\beta^i \ominus \mu_{T_\beta}^i) \oplus \mu_{S,j}^i \right) \quad (21)$$

Figure 12:
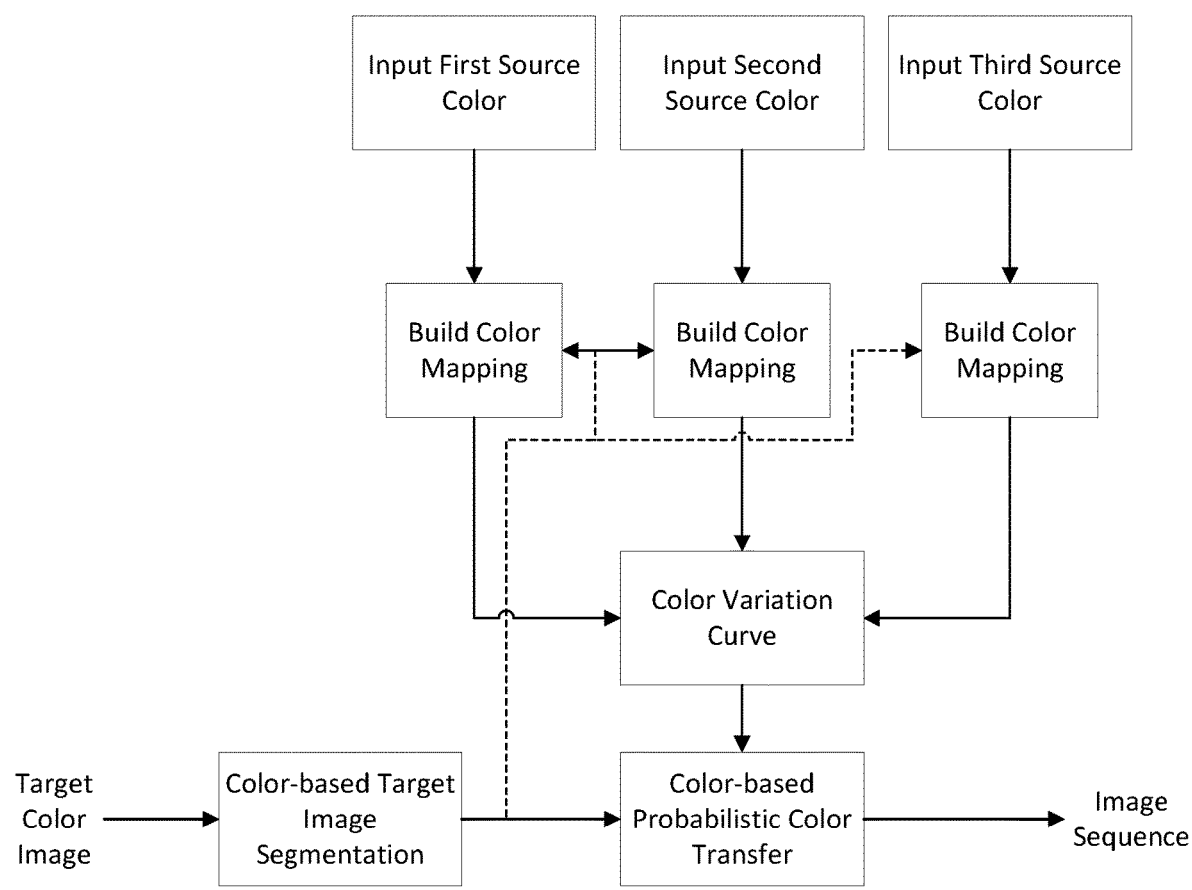
FIG. 12 is a flow diagram of another non-limiting example HIC-based color transfer sequence system and method according to the present disclosure.

FIG. 12 shows another non-limiting HIC-based color transfer system and method 1600 for fashion design. In the fashion industry, the designer needs to pick the right color for their design. However, the color palette has only limited color types. Hence, the designers often only consider the color in their minds or find a similar color in other images. Accordingly, they need a system and method to show their design in different colors which gradually change from some dominant colors. After generating a first design, a designer may input the image into a computer with a camera as the target image. Then the system described in the present disclosure can generate a sequence of images showing the color's gradual changes. The designer can then pick the color he/she wants.

Figure 13:
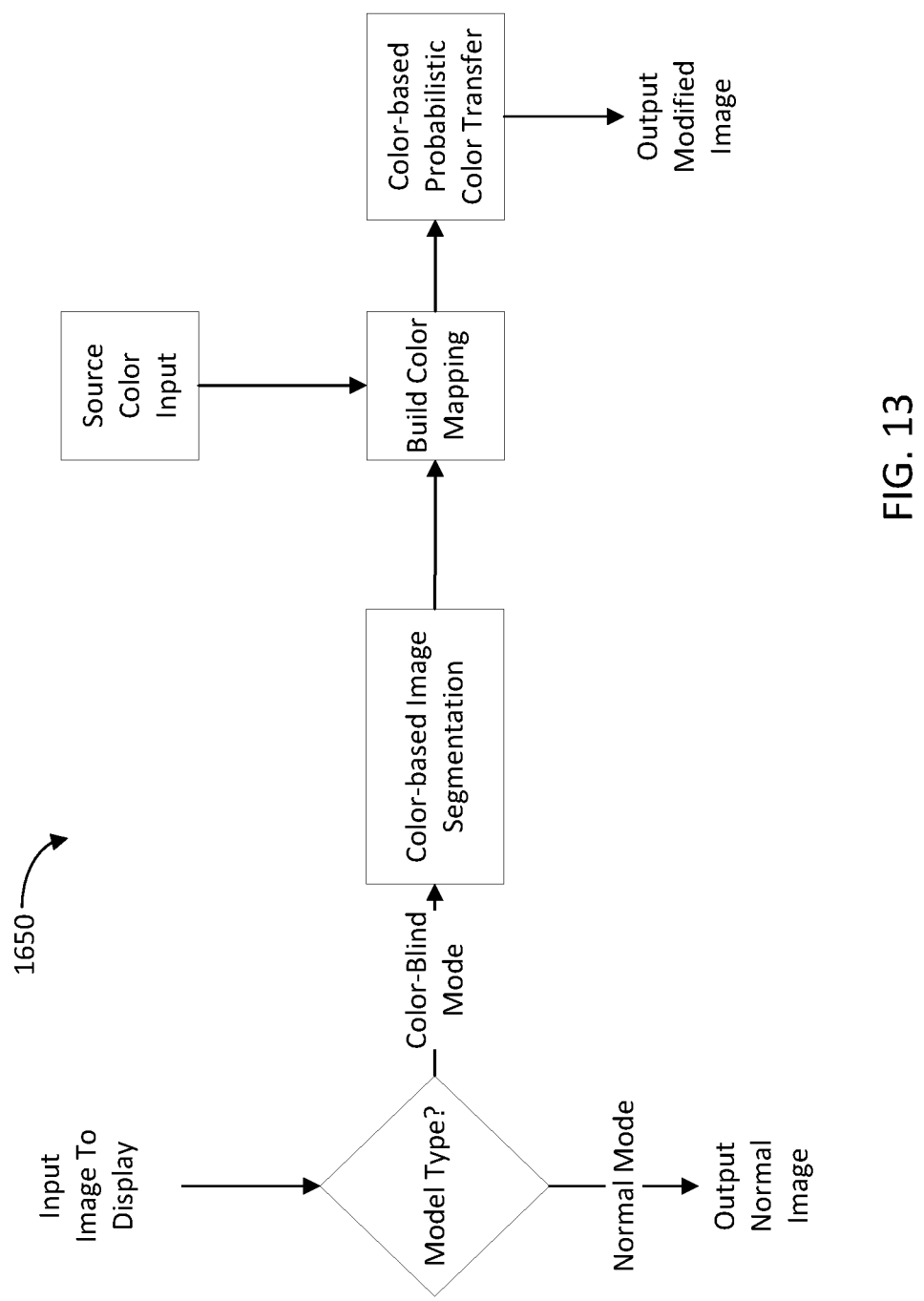
FIG. 13 is a flow diagram of a non-limiting example color-blind HIC-based color transfer system and method according to the present disclosure.

FIG. 13 shows another non-limiting HIC-based color transfer system and method 1650 for supporting systems for people with color blindness. The present disclosure may support the transfer of the images wherein some colors cannot be distinguished by people with color blindness. As an example, a camera positioned within a pair of glasses may collect the images, and transfer some specific colors which cannot be recognized by people with color blindness into some other colors that can be seen by these people, and then show these images on the glasses screen. This may help people with color blindness or difficulty seeing the contents clearly. However, this supporting system is not limited to glasses.

Figure 14:
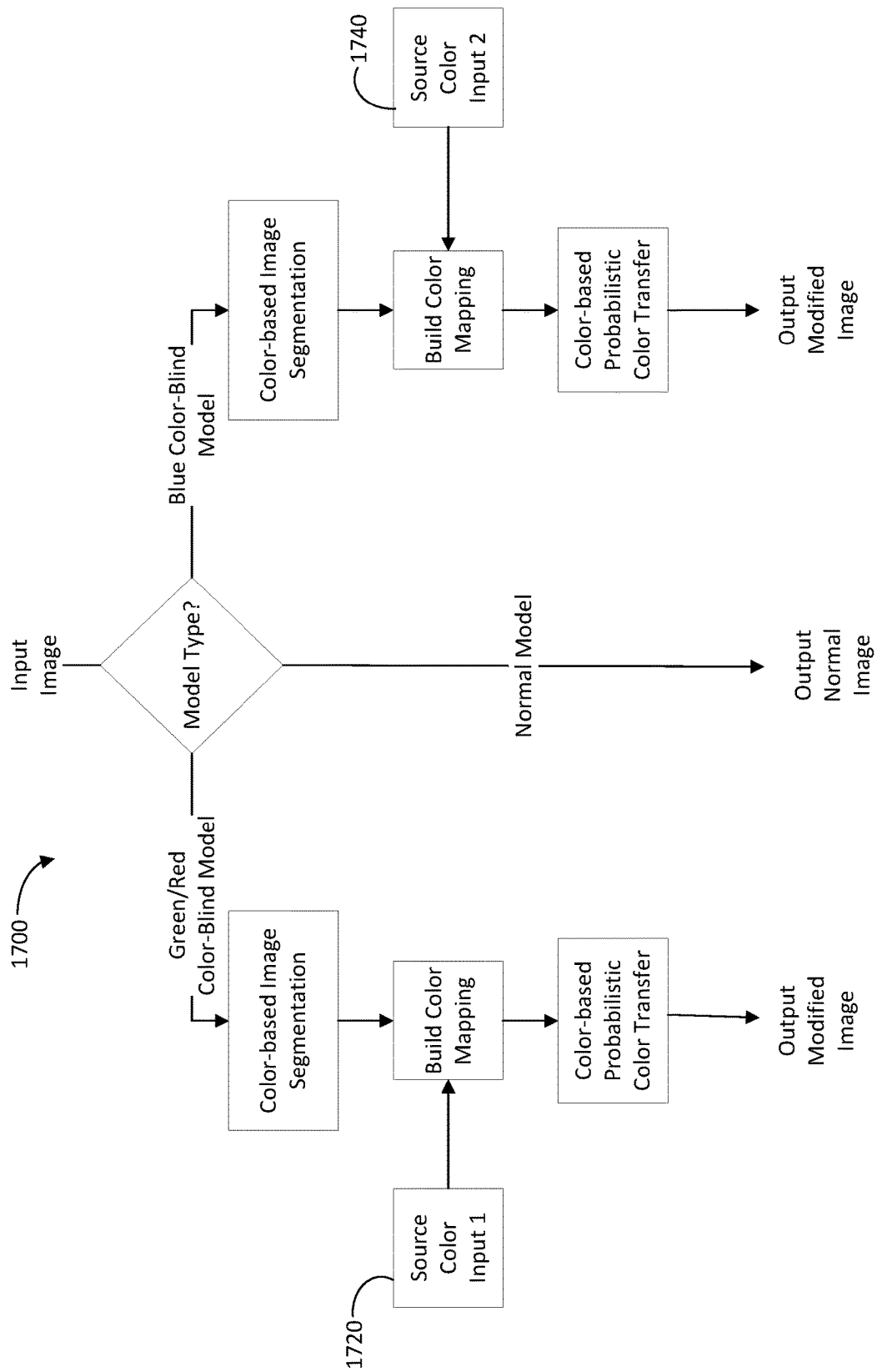
FIG. 14 is a flow diagram of another non-limiting example color-blind HIC-based color transfer system and method according to the present disclosure.

FIG. 14 shows another non-limiting HIC-based color transfer system and method 1700 for printing systems for people with color blindness. When the computer sends the input image to a printer, the printer can provide different working models according to different requirements of users. If the user has the problem of red or green color blindness, the printer can utilize this system to do the color transfer and print the pictures which can be seen by people with red or green blindness (using source color input 1, 1720). If the user has the problem of blue color blindness, the printer can also use this system with different source color settings to display the images (using source color input 2, 1740). The option of this system is not limited to these two kinds of situations—it may include other specific color blindness problems, and therefore use corresponding source color settings. This system may help the printer to print the images which can be easily seen by people with these specific types of color blindness or deficiencies.

In some aspects, this system can be applied in a display device to transfer the images wherein some colors cannot be distinguished by people with color blindness or deficiency to images which can be seen by these people.

Figure 15:
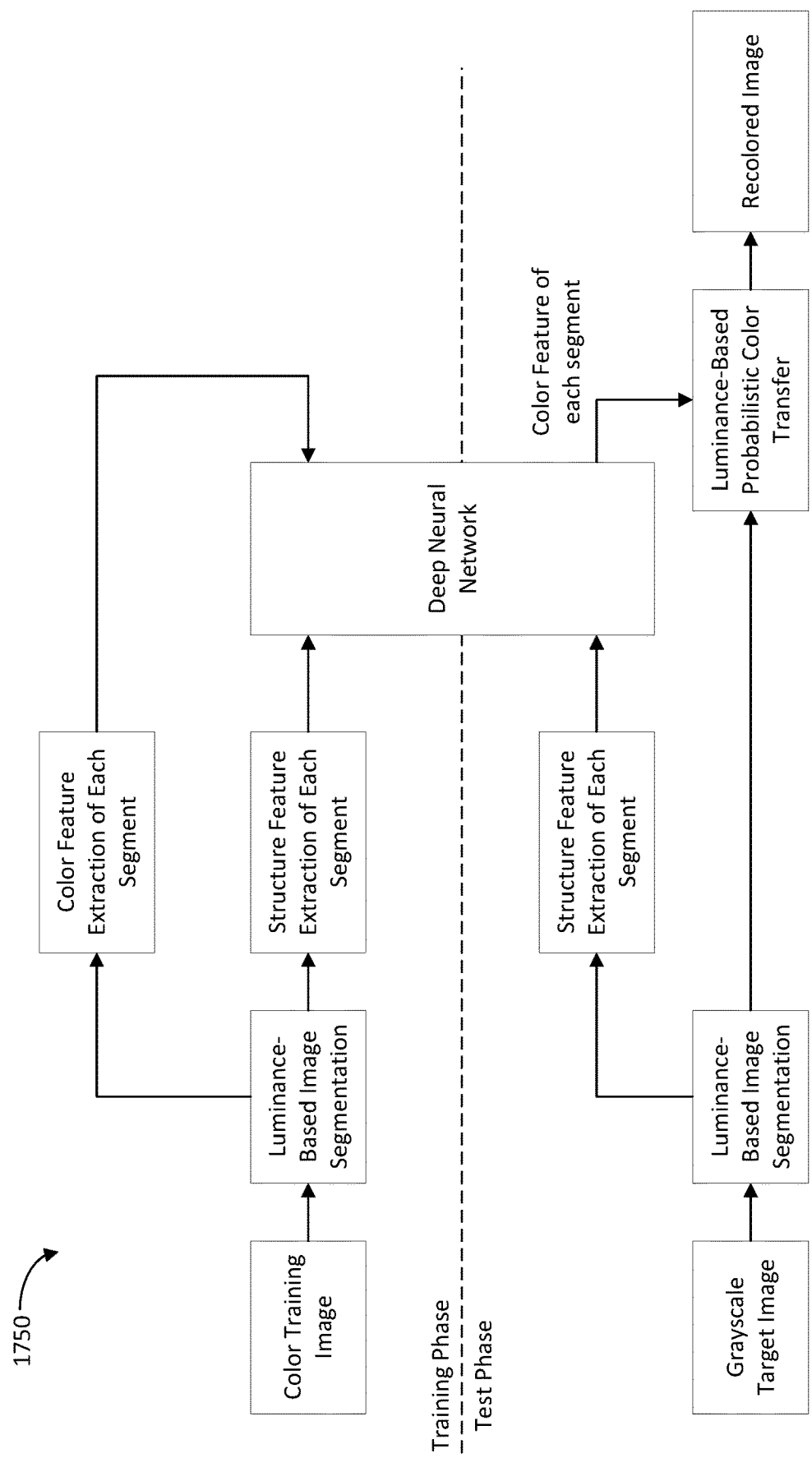
FIG. 15 is a flow diagram of another non-limiting example HIC-based color transfer system and method according to the present disclosure.

FIG. 15 shows another non-limiting HIC-based color transfer system and method 1750 for image coloring without a source image. Instead of using a source image (as previously described), the system 1750 may utilize a deep neural network to generate the source color information (e.g. mean value and standard variance value) based on a structure feature of each segment in the target image.

In the training phase, color training images may be processed with luminance-based image segmentation to extract the color feature (e.g. mean value and standard variance value) and structure feature of each segment. Using the structure feature of each segment as and input, and the color feature as the output, the deep neural network may be trained to minimize cost function.

$$\arg\min_{DNN} \sum_{j=1}^{k1} \sum_{i=1}^{k2} \|DNN(F_S(I_j^i)) - F_C(I_j^i)\|^2 \quad (22)$$

Where, $F_S(I_j^i)$ represents the structure feature of $j^{th}$ segment in $i^{th}$ image of color training image database. DNN( ) represents the deep neural network. $F_C(I_j^i)$ represents the color feature (mean value and standard variance value) of $j^{th}$ segmentation in $i^{th}$ image of color training image database.

In the test phase, the grayscale target image may be processed with luminance-based image segmentation. The structure feature of each segmentation may be extracted and fed into the deep neural network to generate the corresponding color feature information. Using the color feature information as source color information, luminance-based probabilistic color transfer may be applied to recolor the target image.

Figure 16:
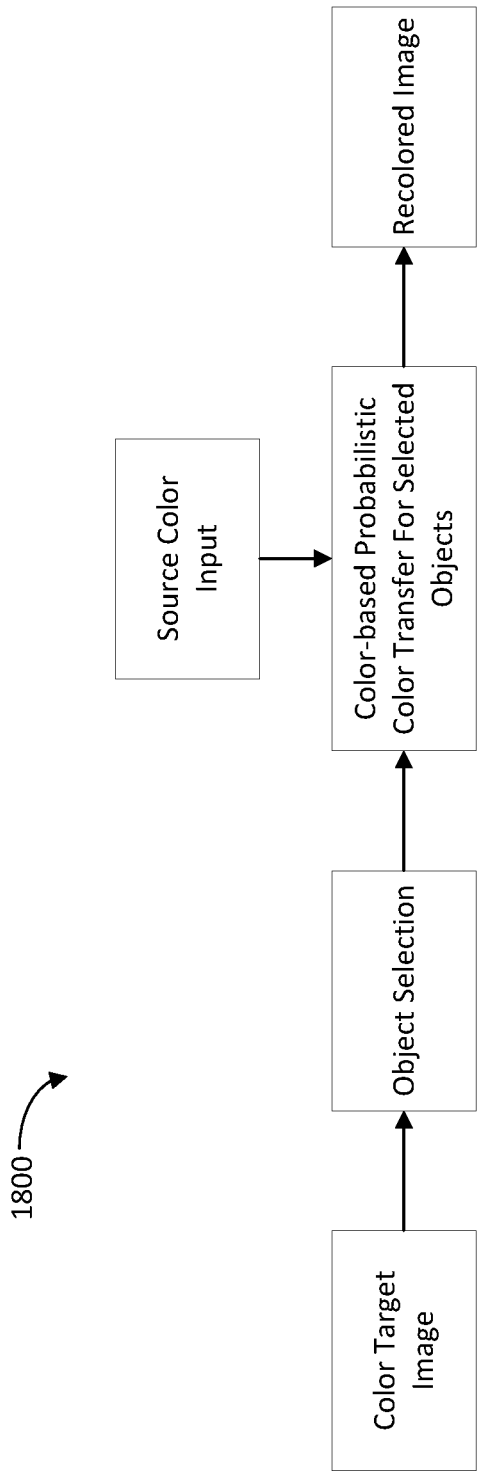
FIG. 16 is a flow diagram of another non-limiting example HIC-based color transfer system and method according to the present disclosure.

FIG. 16 shows another non-limiting HIC-based color transfer system and method 1800 for partial image coloring. As opposed to color transferring the whole image (as previously described), a partial color transfer system may achieve recoloring/coloring of only a portion of images (e.g. selected objects) and leave other portions unchanged. The desired recolored/colored parts of the image may be selected manually or by an object detection algorithm. By only processing selected objects with a probabilistic color transfer algorithm, local partial color transfer may be achieved. This is distinct compared to the previous examples, where global color transfer may occur.

Figure 17:
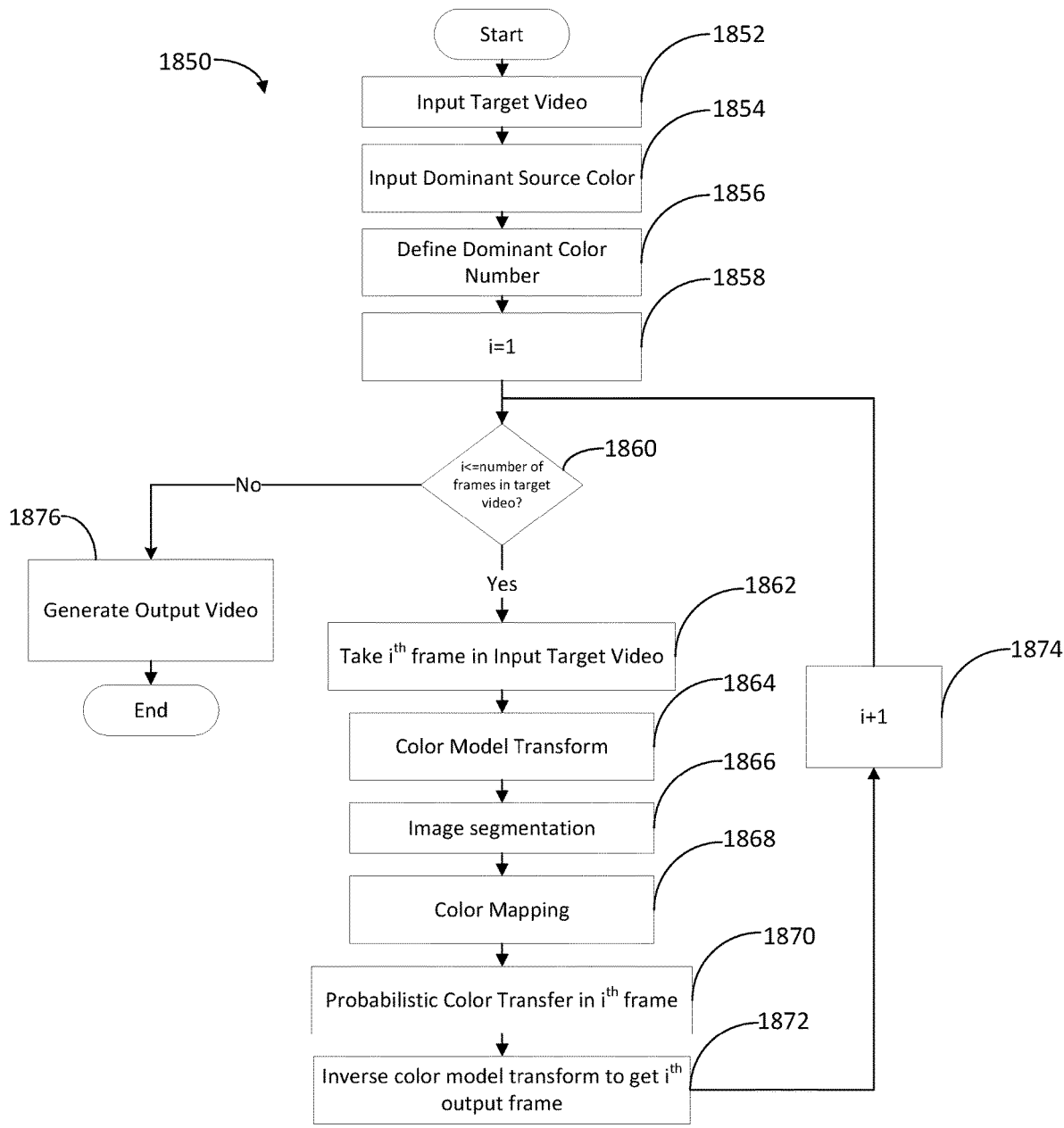
FIG. 17 is a flow diagram illustrating a non-limiting video HIC-based color transfer method according to the present disclosure.

FIG. 17 shows a non-limiting HIC-based color transfer system and method 1850 for use with video. For each frame image in the video, a target image may be acquired. Accordingly, the HIC-based color transfer system may process a recoloring/coloring task to achieve video recoloring and coloring.

Still referring to FIG. 17, at process block 1852, a target video may be used as an input to the system 1850. Next, a user may input dominant source colors (via any of the methods previously described) at process block 1854. The dominant source color numbers may then be determined at process block 1856. Iteration may be used to process each frame in the video, with each frame being processed as an image.

The iteration may be initialized by setting variable i to equal 1 at process block 1858. Decision block 1860 may then determine if i is less than or equal to the number of total frames in the target video. If i is less than or equal to the number of total frame in the target video, the ith frame may be taken as an image at process block 1862. Then, at process block 1864, the image may be transformed via a color model. The image may then be segmented at process block 1866. Once segmented, a color mapping may be determined for the dominant source colors and the dominant target colors, according to process block 1868. A probabilistic color transfer in the ith frame may then occur at process block 1870. Next, the inverse color model transform may be applied to get a corresponding ith output frame, according to process block 1872. Once the ith frame has been processed, i may be incremented by 1 at process block 1874.

Referring again to decision block 1860, if i exceeds the number of frames in the target video, then a video output may be generated at process block 1876.

Figure 18:
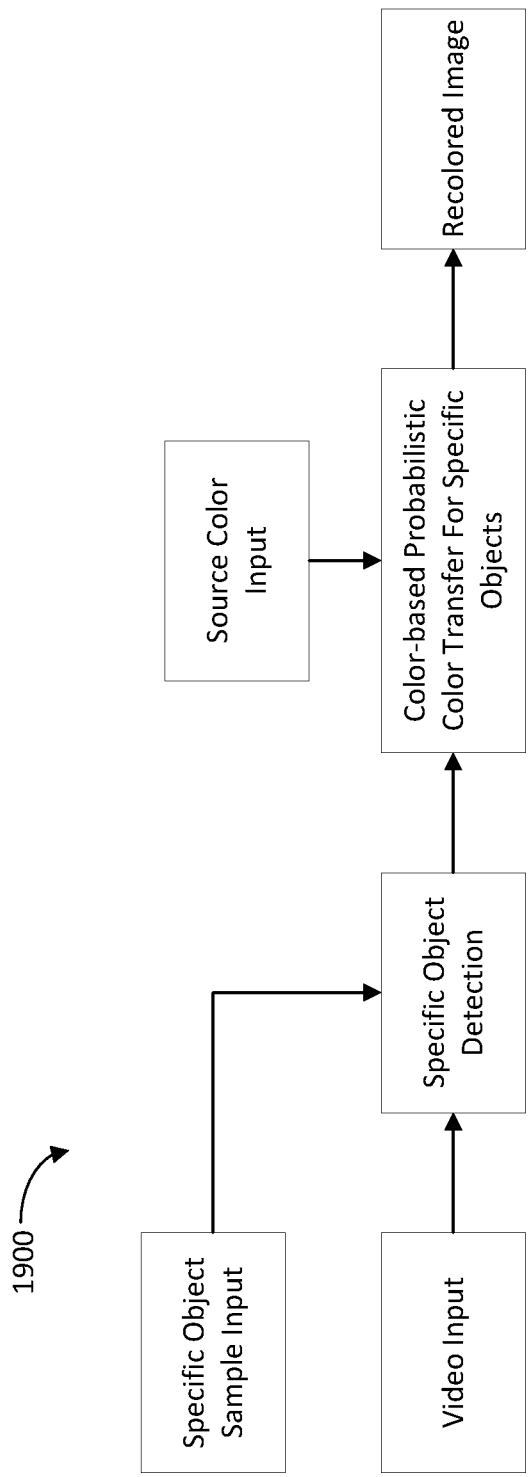
FIG. 18 is a flow diagram of a non-limiting example video HIC-based color transfer system and method according to the present disclosure.

FIG. 18 shows a non-limiting HIC-based color transfer system and method 1900 for use with video. Specifically, system/method 1900 shows specific object color transfer for use in video editing. The example system/method 1900 may have a specific object sample and a video as inputs.

By using objection detection algorithms with structural information (including texture information) to find the specific object sample in the input video, the specific objects in each frame of the input video may be recolored/colored by a corresponding probabilistic color transfer algorithm. As one non-limiting example, the system 1900 may help the film editor to track and recolor/color some specific objects in the whole system to explore different art effects.

Figure 19:
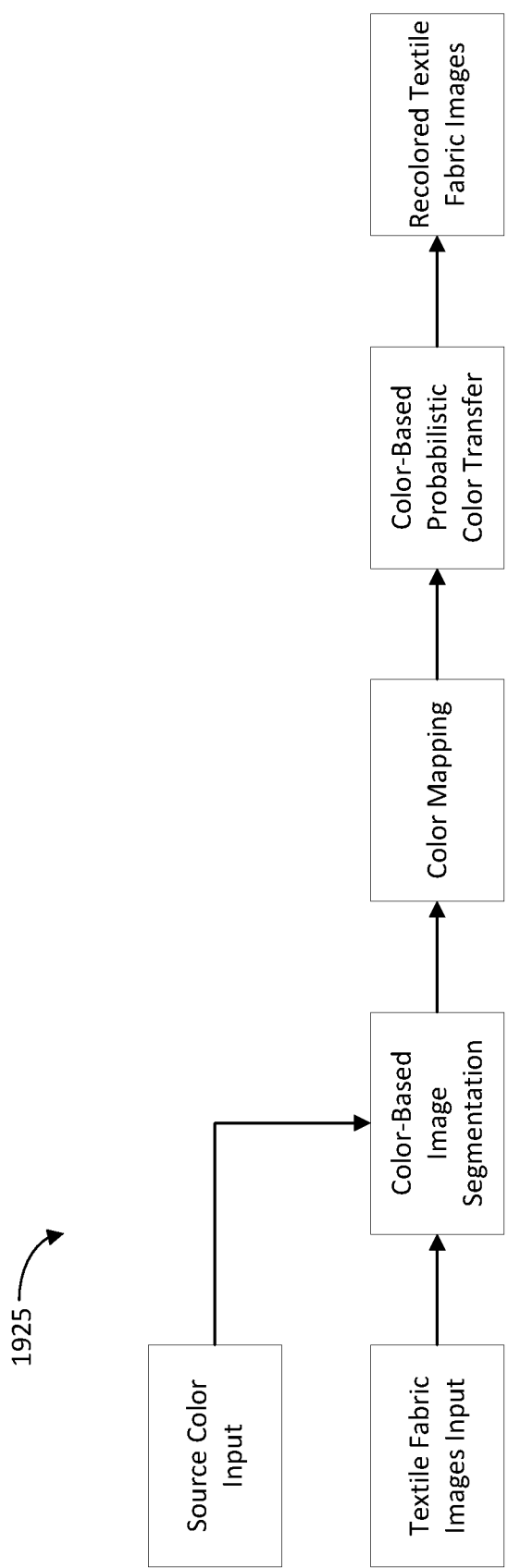
FIG. 19 is a flow diagram of a non-limiting example textile HIC-based color transfer system and method according to the present disclosure.

FIG. 19 shows a non-limiting HIC-based color transfer system and method 1925 that may be used by product designers. In the product design, the physical samples and virtual samples in the computer-aided design software typically have some difference in color appearance. To achieve color design without the cost of producing physical samples for each color option, this system may be applied to take an image of an actual physical sample and recolor it to different color appearances. This may enable designers to select their preferred real-world color, as the coloring is done on the image of the physical sample.

Figure 20:
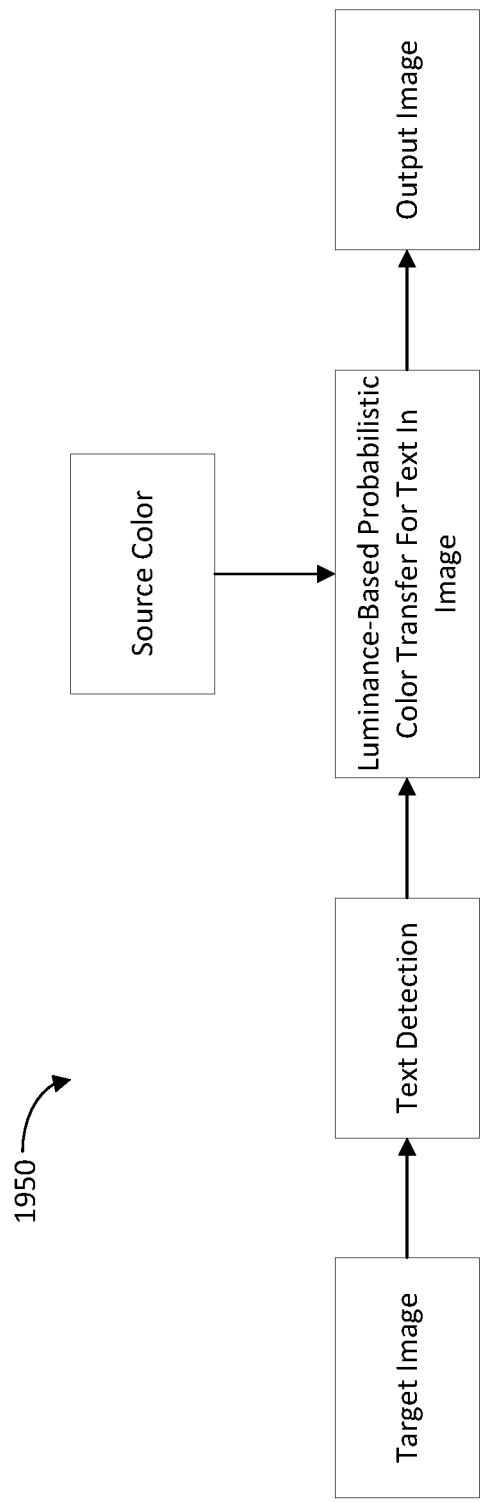
FIG. 20 is a flow diagram of a non-limiting example texture HIC-based color transfer system and method according to the present disclosure.

FIG. 20 shows a non-limiting HIC-based color transfer system and method 1950 that may be used to assist people with a learning disorder or dyslexia. People with a learning disorder/dyslexia typically have reading problems. Research shows that color can assist these individuals. The proposed system may utilize a text detection method to find the locations of all text in an image. Then, a probabilistic color transfer may be used to recolor or color the text in the image to be in a color which may be easier to read.

In one aspect, the present disclosure may be utilized for camouflage (e.g. the military). To make the clothes closer to the background to reduce the possibility of exposure, people can take a picture of the environment. Using the color information extracted from these background pictures, the system in the present disclosure may be utilized to recolor the camouflage model. The present disclosure can be used, but not limited to, for camouflage in clothes, car, and other military facilities.

In one aspect, the present disclosure can be utilized to recolor hair in images to let users decide the color they want for their hair.

In another aspect, the present disclosure may be used for Whole Sliding Imaging. This present disclosure may do the color standardization in whole slide imaging to deal with the problem of color inconsistency in histology images, resulting from the differences in slide thickness, staining, scanning parameters, and illumination. Using the present disclosure, the problem of similar objects in histology images showing different color properties may be overcome. The present disclosure is not limited to whole sliding imaging—it may be utilized for other types of medical images.

In another aspect, the present disclosure may be used for house decoration designs. As an example, when people want to repaint their wall, he/she can take an image of their house and recolor the wall with different colors. This helps users to pick the best color of the paint for their house. This is not limited to wall painting—it may also be applied furniture to decide color.

In another aspect, the present disclosure may be used for database standardization. For different color images in the database, database standardization is a vital preprocess to standardize the color distribution. As an example, histology databases have the problem of color inconsistency, resulting from the differences in operator, slide thickness, staining, scanning parameters, and illumination. To get a standardized database, the system in this present disclosure can be applied to recolor each image in the database with the same source color setting (manually from color palette or automatic extraction from a standard color image as the source image). This system can be applied, but not limited to, other color-related database standardization tasks.

In another aspect, the present disclosure may be used for biometrics. In the performance test of face recognition, using the original face is a normal way to do simulation tests. However, in real applications, people's faces will have some changes, resulting from make-up, luminance, lighting condition, and other reasons. Hence, the robustness of face recognition should be considered in real application of face recognition. In the simulation test, it is difficult to take photos of people's faces with different conditions. Using the system in this present disclosure, one original face can be modified to generate various modified faces to do the tests. This system can be applied, but not limited to, faces, fingerprints, iris recognition, and other biometrics.

In another aspect, the present disclosure may be used for security. As one non-limiting example, images taken at an undisclosed outdoor location may be segmented according to the present disclosure, and the dominant target colors may be compared to a database of known landscape images corresponding to dominant source colors. Using the mapping methods disclosed, the undisclosed outdoor location may be determined.

In another aspect, the present disclosure includes a method of transferring a grayscale target image into a colored target image in an RGB color model, by copying intensity values of the grayscale target image three times, each time to be one component of the three R, G, B components.

The sensors described with reference to the systems and methods described herein can be of any suitable type, such as CCD imaging sensors, CMOS imaging sensors, or any analog or digital imaging sensor. The sensors may be responsive to electromagnetic radiation outside the visible spectrum, such as thermal, gamma, multi-spectral and x-ray sensors. The sensors, in combination with other components in the imaging system, may generate a file in any format, such as the raw data, GIF, JPEG, TIFF, PBM, PGM, PPM, EPSF, X11 bitmap, Utah Raster Toolkit RLE, PDS/VICAR, Sun Rasterfile, BMP, PCX, PNG, IRIS RGB, XPM, Targa, XWD, PostScript, and PM formats on workstations and terminals running the X11 Window System or any image file suitable for import into the data processing system. Additionally, the system may be employed for generating video images, such as digital video images in the .AVI, .WMV, .MOV, .RAM and .MPG formats.

The systems and methods described herein may be implemented in an image processor which may include microcontrollers and microprocessors programmed to receive data from the image sensor pixels and convert the data into an RGB value for display on a monitor. The image processors may be configured with hardware and software to perform one or more of the methods, and any combination of the one or more methods, described herein. The image processor may include a central processing unit (CPU), a memory, and an interconnect bus. The CPU may include a single microprocessor or a plurality of microprocessors for configuring the image processor as a multi-processor system. The memory may include a main memory and a read-only memory. The image processor may also include one or more mass storage devices, e.g., any of various disk drives, tape drives, FLASH drives, etc. The main memory can comprise dynamic random access memory (DRAM) and/or high-speed cache memory. In operation, the main memory stores at least portions of instructions and data for execution by a CPU.

The systems and methods may include a mass storage system, such as one or more magnetic disk or tape drives or optical disk drives, for storing data and instructions for use by the image processor. At least one component of the mass storage system, possibly in the form of a disk drive or tape drive, stores the database used for processing the signals measured from the image sensors. The mass storage system may also (or alternatively) include one or more drives for various portable media, such as a floppy disk, a compact disc read-only memory (CD-ROM), DVD, or an integrated circuit non-volatile memory adapter (i.e. PC-MCIA adapter) to input and output data and code to and from the image processor.

The image processor may also include one or more input/output interfaces for data communications. The data interface may be a modem, a network card, serial port, bus adapter, or any other suitable data communications mechanism for communicating with one or more local or remote systems. The data interface may provide a relatively high-speed link to a network, such as the Internet. The communication link to the network may be, for example, optical, wired, or wireless (e.g., via satellite or cellular network). Alternatively, the image processor may include a mainframe or other type of host computer system capable of communicating via the network.

The image processor may also include suitable input/output ports or use the interconnect bus for interconnection with other components, a local display, and keyboard or other local user interface for programming and/or data retrieval purposes.

In certain embodiments, the image processor includes circuitry for an analog-to-digital converter and/or a digital-to-analog converter. In such embodiments, the analog-to-digital converter circuitry converts analog signals received at the sensors to digital signals for further processing by the image processor.

Certain components of the image processor are those typically found in imaging systems used for portable use as well as fixed use. In certain embodiments, the image processor may be a general purpose computer system, e.g., of the types used as servers, workstations, personal computers, network terminals, and the like. Certain aspects of the systems and methods described herein may relate to the software elements, such as the executable code and database for the server functions of the image processor.

Generally, the methods and techniques described herein may be executed on a conventional data processing platform such as an IBM PC-compatible computer running the Windows operating systems, a SUN workstation running a UNIX operating system or another equivalent personal computer or workstation. Alternatively, the data processing system may comprise a dedicated processing system that includes an embedded programmable data processing unit.

Certain embodiments of the systems and processes described herein may also be realized as software component operating on a conventional data processing system such as a UNIX workstation. In such embodiments, the processes may be implemented as a computer program written in any of several languages well-known to those of ordinary skill in the art, such as (but not limited to) C, C++, FORTRAN, or Java. The processes may also be executed on commonly available clusters of processors, such as Western Scientific Linux clusters, which may allow parallel execution of all or some of the steps in the process.

Certain embodiments of the methods described herein may be performed in either hardware, software, or any combination thereof, as those terms are currently known in the art. In particular, these methods may be carried out by software, firmware, or microcode operating on a computer or computers of any type, including pre-existing or already-installed image processing facilities capable of supporting any or all of the processor's functions. Additionally, software embodying these methods may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, these methods and systems are not limited to any particular platform, unless specifically stated otherwise in the present disclosure.

The systems described herein may include additional electronic, electrical and optical hardware and software elements for capturing images without departing from the scope of the systems and methods described herein. For example, the system may include single-shot systems, which in turn, may include one or more color filters coupled with the imaging sensors (e.g., CCD or CMOS). In another embodiment, the system includes multi-shot systems in which the sensor may be exposed to light from a scene in a sequence of three or more openings of the lens aperture. In such embodiments, one or more imaging sensors may be combined with one or more filters passed in front of the sensor in sequence to obtain the additive color information. In other embodiments, the systems described herein may be combined with computer systems for operating the lenses and/or sensors and processing captured images.

In one aspect, the present disclosure includes a method of transferring color to recolor a target image, the method including: a) receiving the target image, b) determining dominant source colors, c) transforming the target image into a color model including a target luminance component and a target color information component, d) segmenting the target image into a plurality of target segments based on the target color information component or the target luminance component, e) extracting dominant target colors from the target image by extracting information for at least one of the dominant target colors from each target segment of the plurality of target segments, f) generating a color mapping relationship between the dominant target colors and the dominant source colors, and g) creating a recolored target image using the color mapping relationship.

The method may further include receiving user input to alter the creating of step g). The method may further include a source color input algorithm to generate the dominant source colors. The method may include wherein the dominant source colors are selected from a color palette. Additionally, the method may include extracting the dominant source colors from the source image, wherein the source image is selected by a user. The method may further include wherein the target image comprises a grayscale image.

Additionally, the method may include wherein the color model comprises CIELαβ, YCbCr, a color model wherein the target color information component and the target luminance component are independent, or a combination thereof. The method may include wherein the segmenting of step d) includes using an image segmentation algorithm to segment the target image, and calculating a possibility matrix for each pixel belonging to each segment. The method may include wherein the segmenting of step d) is based on the luminance component when the target image is a grayscale image. The method may include wherein the segmenting of step d) is based on the target color information component when the target image is a color image. The method may include calculating the possibility matrix based on a distribution model, Gaussian distribution model, Binomial distribution model, Exponential distribution model, or Poisson distribution model. The method may include calculating the possibility matrix based on a Beta distribution model, a Logit-normal distribution model, a Dirac delta function, or a truncated normal distribution model. The method may further include wherein the color mapping is manually input. The method may include wherein the creating of step g) comprises applying a grayscale-based probabilistic color transfer algorithm. The method may further include wherein the creating of step g) comprises applying a color-based probabilistic color transfer algorithm. The method may further include wherein all the dominant target colors in the target image are transferred into more than one dominant source color. The method may include wherein the determining dominant source colors of step b) includes: i) receiving a source image, ii) transforming the source image into a color model including a source luminance component and a source color information component, iii) segmenting the source image into a plurality of source segments based on the source color information component, and iv) extracting dominant source colors from the source image by extracting information for at least one of the dominant source colors from each source segment of the plurality of source segments.

In another aspect, the present disclosure includes a method for coloring an input grayscale image into an output color image. The method includes: a) selecting dominant source colors from a color palette or one color from a source image, b) applying a color model transformation to transform a target image in an original color model into a color model wherein a target luminance component and a target color information component are independent, c) dividing the target image into a plurality of target regions according to the target luminance component, d) generating a color mapping relationship between at least one dominant target color from each of the plurality of target regions and a dominant source color, e) transferring dominant source color information into a target image, and f) applying an inverse color model algorithm to transfer the color model to a selected color model.

The method may further include receiving user input to alter the transferring of step f). The method may further include wherein the source image is selected by a user. The method may further include wherein the color model comprises CIELαβ, YCbCr, a color model wherein the target color information component and the target luminance component are independent, or a combination thereof. The method may further include wherein the color mapping is manually input. The method may further include wherein the transferring of step e) comprises applying a grayscale-based probabilistic color transfer algorithm.

In another aspect, the present disclosure includes a method for recoloring an input image into an output image with another color appearance, the method comprising: a) selecting dominant source colors, b) applying a color model transformation algorithm to transform a target image in an original color model into a color model wherein a target luminance component and a target color information component are independent, c) dividing the target image into a plurality of target segments according to the target color information component, d) extracting dominant target colors from the target image by extracting information for at least one of the dominant target colors from each target segment of the plurality of target segments, e) generating a color mapping relationship between the dominant target colors and the dominant source colors, f) transferring source color information into a target image based on information generated from a source color input algorithm, and g) applying an inverse color model algorithm to transfer the color model to a selected color model.

The method may further include receiving user input to alter the transferring of step f). The method may further include a source color input algorithm to generate the dominant source colors. The method may further include wherein the dominant source colors are selected from a color palette. The method may further include extracting the dominant source colors from a source image, wherein the source image is selected by a user. The method may further include wherein the color model comprises CIELαβ, YCbCr, a color model wherein the target color information component and the target luminance component are independent, or a combination thereof. The method may further include wherein the dividing of step c) includes using an image segmentation algorithm to segment a source image, and calculating a possibility matrix for each pixel belonging to each segment. The method may further include further comprising calculating the possibility matrix based on a distribution model, Gaussian distribution model, Binomial distribution model, Exponential distribution model, or Poisson distribution model. The method may further include calculating the possibility matrix based on a Beta distribution model, a Logit-normal distribution model, a Dirac delta function, or a truncated normal distribution model. The method may further include wherein the color mapping is manually input. The method may further include wherein the transferring of step f) comprises applying a color-based probabilistic color transfer algorithm.

In another aspect of the present disclosure, a method for image segmentation by data grouping is included, the method comprising: a) receiving an original image, b) setting a number of segment groups manually or automatically via a computer algorithm, c) applying a color model transformation algorithm to transform the original image in an original color model into a color model wherein a target luminance component and a target color information component are independent, d) including the target color information component as a feature for each pixel in the original image, e) grouping the pixels via a Logarithmic GMM method, using each target color information component.

The method may further include wherein the color model comprises CIELαβ, YCbCr, or other color models wherein the target color information component and the target luminance component are independent.

In another aspect, the present disclosure includes a method for image segmentation by data grouping, the method comprising: a) receiving an original image, b) setting a number of segment groups manually or automatically via a computer algorithm, c) applying a color model transformation algorithm to transform the original image in an original color model into a color model wherein a target luminance component and a target color information component are independent, d) including the target color information component as a feature for each pixel in the original image, and e) grouping the pixels via a Logarithmic K-means method, using each target color information component.

The method may further include wherein the color model comprises CIELαβ, YCbCr, or other color models wherein the target color information component and the target luminance component are independent.

In another aspect, the present disclosure includes a method for generating an image sequence showing a gradual changing from a first color appearance to a second color appearance, the method comprising: a) determining at least two sets of dominant source colors, b) applying a color model transformation algorithm to transform a target image in an first color model into a color model wherein a target luminance component and a target color information component are independent, c) segmenting the target image into a plurality of target segments according to the target color information component or the target luminance component, d) extracting dominant target colors from the target image by extracting information for at least one of the dominant target colors from each target segment of the plurality of target segments, e) generating a color mapping relationship between the dominant target colors and the at least two sets of dominant source colors, f) calculating color information for probabilistic color transfer via a color variation curve, g) transferring the color information into a target image by using the color information generated from the color variation curve, and h) applying an inverse color model algorithm to transfer the first color model to a selected second color model.

The method may further include wherein the image sequence corresponds to a video animation.

In another aspect, the present disclosure includes a support system for color-impaired users, the system comprising: a pair of glasses configured to be worn by a color-impaired user, at least one camera affixed to the pair of glasses, and a processor in communication with the at least one camera, the processor configured to: capture at least one image via the at least one camera, determine dominant source colors, segment a target image into a plurality of target segments based on a target color information component, extract dominant target colors from the target image by extracting information for at least one of the dominant target colors from each target segment of the plurality of target segments, generate a color mapping relationship between the dominant target colors and the dominant source colors, transfer color information into the target image, generate images for the color-impaired user, and display the generated images on at least one lens of the pair of glasses.

In another aspect, the present disclosure includes a method for testing the performance of biometrics recognition technology, the method comprising: a) receiving a biometrics image, b) determining dominant source colors, c) segmenting the biometrics image into a plurality of biometric segments based on a biometrics color information component, d) extracting dominant target colors from the biometric image by extracting information for at least one of the dominant target colors from each biometric segment of the plurality of biometric segments, e) generating a color mapping relationship between the dominant target colors and the dominant source colors, f) transferring color information into the biometrics image, g) extracting at least one biometrics feature from the biometrics image of step f), h) comparing the at least one biometrics feature with a reference data set, and i) generating a test result.

The method may further include wherein the biometrics image is a single face image. The method may further include wherein the at least one biometrics feature corresponds to at least one of a face, a fingerprint, and an iris.

In another aspect, the present disclosure includes a method for coloring an input grayscale image into an output colorful image, the method comprising: a) applying a color model transformation algorithm to transform a target image in an original color model into a color model wherein a target luminance component and a target color information component are independent, b) segmenting a target image into a plurality of target segments based on the target luminance component, c) extracting structure features from the target image by extracting information for at least one of the structure features from each target segment of the plurality of target segments, d) generating a source color for each target segment based on each structure feature, via a machine learning model, e) transferring the dominant source colors into the target image via a copy process, and f) applying an inverse color model algorithm to transfer the original color model to a selected second color model.

The method may further include wherein the machine learning model is one of a deep neural network or a neural network.

In another aspect, the present disclosure includes a method for partial color transfer, the method comprising: a) selecting an object to be color transferred, the object included in a target image, b) determining dominant source colors, c) transforming the target image from an original color model into a color model including a target luminance component and a target color information component, d) segmenting the object into a plurality of object segments based on the target color information component or the target luminance component, e) extracting dominant target colors from the object by extracting information for at least one of the dominant target colors from each object segment of the plurality of object segments, f) generating a color mapping relationship between the dominant target colors and the dominant source colors, g) transferring color information into the object, and h) applying an inverse color model algorithm to transfer the original color model to a selected color model.

The method may further include wherein the target image is in grayscale, and step g) includes a luminance-based probabilistic color transfer. The method may further include wherein the object to color transfer is selected manually. The method may further include wherein the object to color transfer is automatically detected via an object detection algorithm.

In another aspect, the present disclosure includes a method for partial color transfer in a video, the method comprising: a) inputting at least one object to be color transferred, the at least one object included in a video, b) detecting the at least one object in each frame image of the video, c) determining dominant source colors, d) transforming each frame image from an original color model into a color model including a frame luminance component and a frame color information component, e) segmenting the at least one object into a plurality of object segments based on the frame color information component or the frame luminance component, f) extracting dominant target colors from the at least one object by extracting information for at least one of the dominant target colors from each object segment of the plurality of object segments, g) generating a color mapping relationship between the dominant target colors and the dominant source colors, h) transferring color information into the at least one object in each frame image, and i) applying an inverse color model algorithm to transfer the original color model to a selected color model.

The method may further include wherein the video is grayscale and step e) is based on the luminance component. The method may further include wherein the target image is a picture of a physical product sample.

In another aspect, the present disclosure includes a method of recoloring text for people with a learning disability, the method comprising: a) detecting and extracting text from a target image, b) transforming the target image from an original color model into a color model including a target luminance component and a target color information component, c) determining dominant source colors, d) transferring color information into the text via probabilistic color transfer, and e) applying an inverse color model algorithm to transfer the original color model to a selected color model.

The method may further include wherein the dominant source colors are selected from a color palette. The method may further include wherein the dominant source colors are determined from a source image. The method may further include wherein step d) includes transferring via probabilistic color transfer. The method may further include wherein the selected color model is selected by a user. The method may further include wherein the text of step a) is in grayscale.

In another aspect, the present disclosure includes a non-transitory computer-readable medium having stored thereon instructions that, when executed by a processor, cause the processor to execute the method of any of the previous claims.

The foregoing merely illustrates the principles of the disclosure. Various modifications and alterations to the described aspects will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. Further, the exemplary aspects described herein can operate together with one another and interchangeably therewith. In addition, to the extent that the prior art knowledge has not been explicitly incorporated by reference herein above, it is explicitly being incorporated herein in its entirety. All publications referenced herein above are incorporated herein by reference in their entireties.

We claim:

1. A method of transferring color to recolor a target image, the method comprising:
   a) receiving the target image;
   b) determining dominant source colors;
   c) transforming the target image into a color model including a target luminance component and a target color information component;
   d) segmenting the target image into a plurality of target segments based on the target color information component or the target luminance component;
   e) extracting dominant target colors from the target image by extracting information for at least one of the dominant target colors from each target segment of the plurality of target segments;
   f) generating a color mapping relationship between the dominant target colors and the dominant source colors; and
   g) creating a recolored target image using the color mapping relationship.

2. The method of claim 1, further comprising receiving user input to alter the creating of step g).

3. The method of claim 1, further comprising a source color input algorithm to generate the dominant source colors.

4. The method of claim 1, wherein the dominant source colors are selected from a color palette.

5. The method of claim 1, further comprising extracting the dominant source colors from a source image, wherein the source image is selected by a user.

6. The method of claim 1, wherein the target image comprises a grayscale image.

7. The method of claim 1, wherein the color model comprises CIEL$\alpha\beta$, YCbCr, a color model wherein the target color information component and the target luminance component are independent, or a combination thereof.

8. The method of claim 1, wherein the segmenting of step d) includes using an image segmentation algorithm to segment the target image, and calculating a possibility matrix for each pixel belonging to each segment.

9. The method of claim 1, wherein the segmenting of step d) is based on the luminance component when the target image is a grayscale image.

10. The method of claim 1, wherein the segmenting of step d) is based on the target color information component when the target image is a color image.

11. The method of claim 8, further comprising calculating the possibility matrix based on a distribution model, Gaussian distribution model, Binomial distribution model, Exponential distribution model, or Poisson distribution model.

12. The method of claim 8, further comprising calculating the possibility matrix based on a Beta distribution model, a Logit-normal distribution model, a Dirac delta function, or a truncated normal distribution model.

13. The method of claim 1, wherein the color mapping is manually input.

14. The method of claim 1, wherein the creating of step g) comprises applying a grayscale-based probabilistic color transfer algorithm.

15. The method of claim 1, wherein the creating of step g) comprises applying a color-based probabilistic color transfer algorithm.

16. The method of claim 15, wherein all the dominant target colors in the target image are transferred into more than one dominant source color.

17. The method of claim 1, wherein the determining dominant source colors of step b) includes:
   i) receiving a source image;
   ii) transforming the source image into a color model including a source luminance component and a source color information component;
   iii) segmenting the source image into a plurality of source segments based on the source color information component; and
   iv) extracting dominant source colors from the source image by extracting information for at least one of the dominant source colors from each source segment of the plurality of source segments.

18. A method for coloring an input grayscale image into an output color image, the method comprising:
   a) selecting dominant source colors from a color palette or one color from a source image;
   b) applying a color model transformation to transform a target image in an original color model into a color model wherein a target luminance component and a target color information component are independent;

c) dividing the target image into a plurality of target regions according to the target luminance component;

d) generating a color mapping relationship between at least one dominant target color from each of the plurality of target regions and a dominant source color;

e) transferring dominant source color information into a target image; and f) applying an inverse color model algorithm to transfer the color model to a selected color model.

19. The method of claim 18, further comprising receiving user input to alter the transferring of step f).

20. A support system for color-impaired users, the system comprising:

a pair of glasses configured to be worn by a color-impaired user;

at least one camera affixed to the pair of glasses;

a processor in communication with the at least one camera, the processor configured to:

capture at least one image via the at least one camera;

determine dominant source colors;

segment a target image into a plurality of target segments based on a target color information component;

extract dominant target colors from the target image by extracting information for at least one of the dominant target colors from each target segment of the plurality of target segments;

generate a color mapping relationship between the dominant target colors and the dominant source colors;

transfer color information into the target image;

generate images for the color-impaired user; and display the generated images on at least one lens of the pair of glasses.

* * * * *